(12) United States Patent
Zhao

(10) Patent No.: US 11,729,767 B2
(45) Date of Patent: *Aug. 15, 2023

(54) METHOD OF INDICATING UPLINK FEEDBACK INFORMATION AND METHOD OF TRANSMITTING UPLINK FEEDBACK INFORMATION

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,825

(22) Filed: Oct. 11, 2022

(65) Prior Publication Data

US 2023/0111403 A1  Apr. 13, 2023

Related U.S. Application Data

(63) Continuation of application No. 16/764,854, filed as application No. PCT/CN2017/113386 on Nov. 28, 2017, now Pat. No. 11,510,230.

(51) Int. Cl.
*H04W 72/12* (2023.01)
*H04W 72/1268* (2023.01)
*H04W 72/21* (2023.01)

(52) U.S. Cl.
CPC ....... *H04W 72/1268* (2013.01); *H04W 72/21* (2023.01)

(58) Field of Classification Search
CPC .................... H04W 72/1268; H04W 72/1284
See application file for complete search history.

(56) References Cited

U.S. PATENT DOCUMENTS

| | | | | |
|---|---|---|---|---|
| 9,979,525 | B2* | 5/2018 | Tang | H04W 72/21 |
| 11,510,230 | B2* | 11/2022 | Zhao | H04L 5/0053 |
| 2008/0095109 | A1* | 4/2008 | Malladi | H04L 1/1858 |
| | | | | 714/749 |
| 2008/0253318 | A1* | 10/2008 | Malladi | H04L 1/1854 |
| | | | | 370/328 |

(Continued)

*Primary Examiner* — Brenda H Pham
(74) *Attorney, Agent, or Firm* — Syncoda LLC; Feng Ma

(57) ABSTRACT

A method of indicating uplink feedback information includes: dividing time/frequency resources, configured to facilitate user equipment transmitting uplink control information, into at least one time/frequency resource set for the uplink control information; counting, based on the set to which time/frequency resources for transmitting uplink feedback information corresponding to downlink data for the user equipment belong, pieces of the uplink feedback information in a preset manner; and transmitting one or more current count values to the user equipment in transmitting downlink scheduling information or uplink scheduling information; wherein the dividing the time/frequency resources, configured to facilitate the user equipment transmitting the uplink control information, into the at least one time/frequency resource set for the uplink control information includes: performing the dividing according to a time unit to which the time/frequency resources for the uplink control information belong in the time domain, wherein the time unit belongs to a time slot.

19 Claims, 23 Drawing Sheets

(56) References Cited

U.S. PATENT DOCUMENTS

| | | | | |
|---|---|---|---|---|
| 2010/0111024 | A1* | 5/2010 | Fan | H04L 1/1861 370/329 |
| 2011/0280206 | A1* | 11/2011 | Johansson | H04W 72/20 370/329 |
| 2012/0134305 | A1* | 5/2012 | Damnjanovic | H04L 1/1607 370/280 |
| 2018/0084457 | A1* | 3/2018 | Lin | H04L 5/0055 |
| 2018/0338301 | A1* | 11/2018 | Gao | H04W 72/23 |

\* cited by examiner

METHOD OF INDICATING UPLINK FEEDBACK INFORMATION AND METHOD OF TRANSMITTING UPLINK FEEDBACK INFORMATION

CROSS-REFERENCE TO RELATED APPLICATIONS

This is a continuation of U.S. patent application Ser. No. 16/764,854 filed on May 16, 2020, which is a national stage of International Application No. PCT/CN2017/113386 filed on Nov. 28, 2017. The disclosures of the above-referenced applications are hereby incorporated by reference in their entirety for all purposes.

BACKGROUND

During interaction between user equipment and a base station, if uplink data and uplink control information transmitted by the user equipment overlap with each other in a time domain, the user equipment can multiplex a time/frequency resource for transmitting uplink data and transmit an uplink control signal on the time/frequency resource for transmitting uplink data, that is, uplink control information (UCI) piggyback.

SUMMARY

The present disclosure relates generally to the field of communications technologies, and more specifically to a method of indicating uplink feedback information, an apparatus for indicating uplink feedback information, a method of transmitting uplink feedback information, an apparatus for transmitting uplink feedback information, an electronic device, and a computer-readable storage medium.

Various embodiments of the present disclosure provide a method of indicating uplink feedback information, an apparatus for indicating uplink feedback information, a method of transmitting uplink feedback information, an apparatus for transmitting uplink feedback information, an electronic device, and a computer-readable storage medium.

According to a first aspect of the present disclosure, a method of indicating uplink feedback information is provided, which is applicable to a base station. The method includes:

dividing time/frequency resources, which can be used by user equipment to transmit uplink control information, into at least one time/frequency resource set for the uplink control information;

notifying a division rule and/or result with respect to the time/frequency resource set for transmitting the uplink control information to the user equipment.

counting pieces of uplink feedback information in a preset manner, based on the set to which time/frequency resources for transmitting uplink feedback information corresponding to downlink data for the user equipment belong; and transmitting one or more current count values to the user equipment in transmitting downlink scheduling information and/or uplink scheduling information.

According to a second aspect of the present disclosure, a method of transmitting uplink feedback information is provided, which is applicable to user equipment. The method includes:

dividing, according to a same division rule and/or result as that used by a base station with respect to a time/frequency resource set for transmitting uplink control information, time/frequency resources, which can be used by the user equipment to transmit the uplink control information, into at least one time/frequency resource set for the uplink control information;

receiving one or more current count values from the base station in receiving downlink scheduling information and/or uplink scheduling information;

according to the current count value, time/frequency resources indicated by the downlink scheduling information for transmitting uplink feedback information, the division rule and/or result with respect to the time/frequency resource set for uplink control information, and time/frequency resources indicated by the uplink scheduling information for transmitting uplink data, determining the division rule and/or result, determining time/frequency resources for transmitting the uplink feedback information, and determining uplink feedback information to be transmitted by multiplexing the time/frequency resources for transmitting the uplink data; and transmitting the uplink feedback information to the base station by multiplexing the time/frequency resources for transmitting the uplink data.

According to a third aspect of the present disclosure, an apparatus for indicating uplink feedback information is provided, which is applicable to a base station, and the apparatus includes:

a dividing module configured to divide time/frequency resources, which can be used by user equipment to transmit uplink control information, into at least one time/frequency resource set for the uplink control information;

a counting module configured to count, based on the set to which time/frequency resources for transmitting uplink feedback information corresponding to downlink data for the user equipment belong, pieces of the uplink feedback information in a preset manner; and a count transmitting module configured to transmit one or more current count values to the user equipment in transmitting downlink scheduling information and/or uplink scheduling information.

According to a fourth aspect of the present disclosure, an apparatus for transmitting uplink feedback information is provided, which is applicable to user equipment. The apparatus includes:

a dividing module configured to divide, according to a same division rule and/or result as that used by a base station with respect to a time/frequency resource set for transmitting uplink control information, time/frequency resources, which can be used by the user equipment to transmit the uplink control information, into at least one time/frequency resource set for the uplink control information;

a count receiving module configured to receive one or more current count values from the base station in receiving downlink scheduling information and/or uplink scheduling information;

a determining module determine, according to the current count values, time/frequency resources indicated by the downlink scheduling information for transmitting uplink feedback information, the division rule and/or result with respect to the set, and time/frequency resources indicated by the uplink scheduling information for transmitting uplink data, uplink feedback information to be transmitted by multiplexing the time/frequency resources for transmitting the uplink data; and a transmitting module configured to transmit the uplink feedback information to the base station by multiplexing the time/frequency resources for transmitting the uplink data.

According to a fifth aspect of the present disclosure, an electronic device is provided, including:

a processor; and a memory device for storing instructions executed by the processor;

where the processor is configured to divide time/frequency resources, which can be used by user equipment to transmit uplink control information, into at least one time/frequency resource set for the uplink control information;

count, based on the set to which time/frequency resources for transmitting uplink feedback information corresponding to downlink data for the user equipment belong, pieces of the uplink feedback information in a preset manner; and transmit one or more current count values to the user equipment in transmitting downlink scheduling information and/or uplink scheduling information.

According to a sixth aspect of the present disclosure, an electronic device is provided, including:

a processor; and a memory device for storing instructions executed by the processor;

where the processor is configured to divide, according to a same division rule and/or result as that used by a base station with respect to a time/frequency resource set for transmitting uplink control information, time/frequency resources, which can be used by the user equipment to transmit the uplink control information, into at least one time/frequency resource set for the uplink control information;

receive one or more current count values from the base station in receiving downlink scheduling information and/or uplink scheduling information;

determine, according to the current count values, time/frequency resources indicated by the downlink scheduling information for transmitting uplink feedback information, the division rule and/or result with respect to the set, and time/frequency resources indicated by the uplink scheduling information for transmitting uplink data, uplink feedback information to be transmitted by multiplexing the time/frequency resources for transmitting the uplink data; and transmit the uplink feedback information to the base station by multiplexing the time/frequency resources for transmitting the uplink data.

According to a seventh aspect of the present disclosure, a computer-readable storage medium is provided, the computer-readable storage medium storing a computer program that, when executed by a processor, causes the processor to:

divide time/frequency resources, which can be used by user equipment to transmit uplink control information, into at least one time/frequency resource set for the uplink control information;

count, based on the set to which time/frequency resources for transmitting uplink feedback information corresponding to downlink data for the user equipment belong, pieces of the uplink feedback information in a preset manner; and transmit one or more current count values to the user equipment in transmitting downlink scheduling information and/or uplink scheduling information.

According to an eighth aspect of the present disclosure, a computer-readable storage medium is provided, the computer-readable storage medium storing a computer program that, when executed by a processor, causes the processor to:

divide, according to a same division rule and/or result as that used by a base station with respect to a time/frequency resource set for transmitting uplink control information, time/frequency resources, which can be used by the user equipment to transmit the uplink control information, into at least one time/frequency resource set for the uplink control information;

receive one or more current count values from the base station in receiving downlink scheduling information and/or uplink scheduling information;

determine, according to the current count values, time/frequency resources indicated by the downlink scheduling information for transmitting uplink feedback information, the division rule and/or result with respect to the set, and time/frequency resources indicated by the uplink scheduling information for transmitting uplink data, uplink feedback information to be transmitted by multiplexing the time/frequency resources for transmitting the uplink data; and transmit the uplink feedback information to the base station by multiplexing the time/frequency resources for transmitting the uplink data.

According to the examples of the present disclosure, the user equipment may determine a division rule and/or result with respect to the time/frequency resource set for the uplink control information according to pre-configuration, and may also receive the division rule and/or result with respect to the time/frequency resource set for the uplink control information from the base station. Taking the user equipment determining division result with respect to the time/frequency resource set for the uplink control information as an example, the current count values are transmitted to the user equipment, so that the user equipment can determine the number of pieces of uplink feedback information which requires to be transmitted by multiplexing the time/frequency resources for transmitting uplink data. Thus, it can be ensured that the number of pieces of uplink feedback information to be transmitted from the user equipment by multiplexing the time/frequency resources for transmitting the uplink data is the same as the number of pieces of downlink data which is transmitted from the base station and corresponds to the uplink feedback information, thereby ensuring good communication between the user equipment and the base station.

BRIEF DESCRIPTION OF THE DRAWINGS

To explain the technical solutions in the embodiments of the present disclosure more clearly, the drawings used in the description of the embodiments will be briefly introduced below. Apparently, the drawings in the following description are only some embodiments of the present disclosure. For those of ordinary skill in the art, other embodiments can be obtained based on these drawings without paying creative labor.

DETAILED DESCRIPTION

The following will clearly and completely describe the technical solutions in the embodiments of the present disclosure with reference to the accompanying drawings in the embodiments of the present disclosure. Apparently, the described embodiments are only a part of the embodiments of the present disclosure, but not all of the embodiments. Based on the embodiments in the present disclosure, all other embodiments obtained by a person of ordinary skill in the art without creative efforts shall fall within the protection scope of the present disclosure.

When the uplink control signal is transmitted on the time/frequency resource for transmitting uplink data, there may be a problem that the base station and the user equipment might have inconsistent recognitions of content such as the number of pieces of uplink feedback information or the like in the uplink control information.

To solve the above problem, a DAI (Downlink Assignment Indicator) mechanism is introduced in LTE (Long Term Evolution), where DAI_counter is introduced in downlink scheduling information and DAI_Total is introduced in uplink scheduling information. A value of DAI_counter indicates the number of pieces of uplink feedback information, which corresponds to downlink data and is to be transmitted in the same subframe as that for the uplink data. A value of DAI_Total is equal to the value of the last changed DAI_counter. Based on this, the user equipment can determine, from the value of DAI_Total, whether the downlink scheduling information is missed and the number of pieces of uplink feedback information that is to be transmitted to the base station in the same subframe as that for the uplink data.

In LTE, since each of uplink data and uplink control information is transmitted in units of subframes, the uplink control information and the uplink data either completely overlap or do not overlap at all with each other in the time domain, that is, there is no case of partial overlap. Thus, DAI_counter is a count of pieces of uplink feedback information which completely overlaps with uplink data in a subframe in the time domain.

However, in NR (New Radio), neither uplink data nor uplink control information is transmitted in a fixed unit. There may be a case where the uplink data and the uplink control information partially overlap with each other in the time domain, or a case where two pieces of uplink feedback information do not overlap with each other in the time domain, but overlap respectively with two pieces of uplink data in the time domain. For such cases, according to the mechanism in the related art, the value of DAI_counter cannot be determined and thus the value of DAI_Total cannot be determined, so that the user equipment cannot determine the number of pieces of uplink feedback information that is transmitted to the base station in the same subframe as that for the uplink data.

Figure 1:
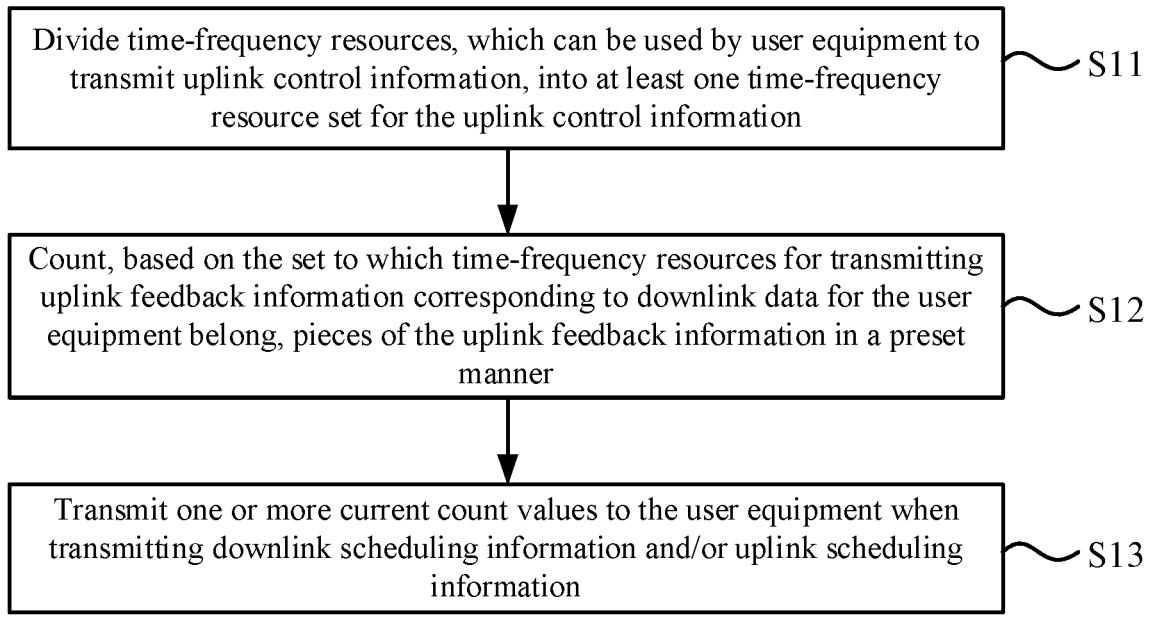
FIG. 1 illustrates a method of indicating uplink feedback information according to some embodiments of the present disclosure. The method of indicating uplink feedback information shown in this example can be applied to a base station.

FIG. 1 is a schematic flowchart illustrating a method of indicating uplink feedback information according to some embodiments of the present disclosure. The method of indicating uplink feedback information shown in the example can be applied to a base station. As shown in FIG. 1, the method of indicating uplink feedback information can include the following steps.

At step S11, time/frequency resources which can be used by user equipment to transmit uplink control information are divided into at least one time/frequency resource set for the uplink control information.

Figure 2:
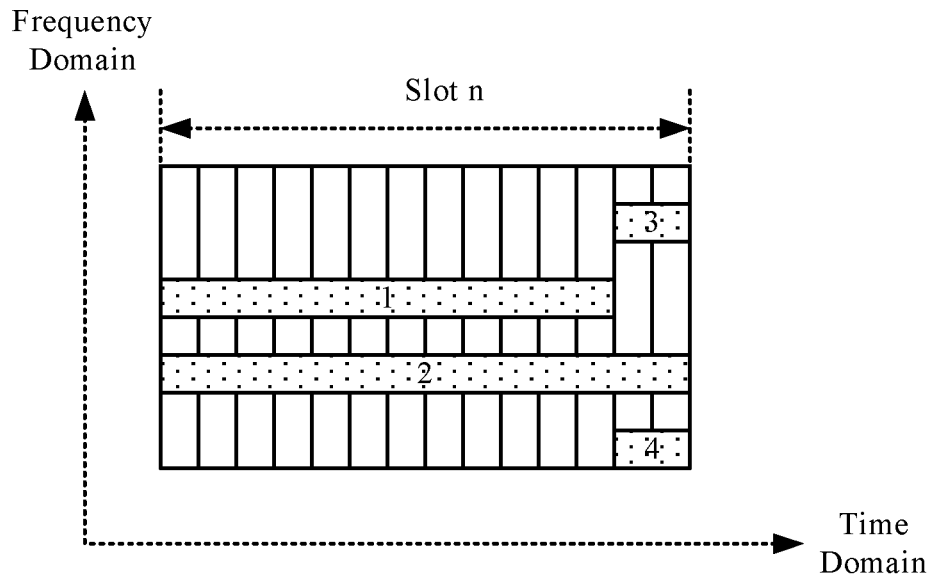
FIG. 2 is a schematic diagram illustrating a time/frequency resource according to some embodiments of the present disclosure.

FIG. 2 is a schematic diagram illustrating a time/frequency resource according to some embodiments of the present disclosure.

In some embodiments, for example, uplink control information, indicated by downlink scheduling information sent from a base station to the user equipment, has a size of 2 bits, and then the time/frequency resources for transmitting the uplink control information can be 4 types. As shown in FIG. 2, for time slot n, one time slot contains 14 symbols, the time/frequency resources that the user equipment can use to transmit the uplink control information include first time/frequency resource 1, second time/frequency resource 2, third time/frequency resource 3 and fourth time/frequency resource 4.

In some embodiments, the rules for dividing the set can be pre-configured to the base station and the user equipment by a protocol, or can be set by the base station according to requirement. When the base station side configures the division rule with respect to the set according to the requirement, the base station may send the division rule with respect to the set to the user equipment, or send a division result with respect to the set to the user equipment, or send both of the division rule and result with respect to the set to the user equipment.

In some embodiments, the following description is based on the example shown in FIG. 2.

For example, according to a first manner, all resources in time slot n are divided into one set, then set 1 includes first time/frequency resource 1, second time/frequency resource 2, third time/frequency resource 3, and fourth time/frequency resources 4.

For example, according to a second manner, all resources in time slot n are divided into two sets. For example, set 1 includes first time/frequency resource 1 and second time/frequency resource 2, and set 2 includes third time/frequency resource 3 and fourth time/frequency resource 4.

For example, according to a third manner, all resources in time slot n are divided into three sets. For example, set 1 includes first time/frequency resource 1, set 2 includes second time/frequency resource 2, and set 3 includes third time/frequency resource 3 and fourth time/frequency resource 4.

It should be noted that the rules for dividing into the sets are not limited to the above three manners, and are not limited to the division of the above four time/frequency resources, which will not be elaborated herein.

At step S12, based on the set to which time/frequency resources for transmitting uplink feedback information corresponding to downlink data for the user equipment belong, pieces of the uplink feedback information are counted in a preset manner.

In some embodiments, the uplink feedback information can be included in the uplink control information. The uplink feedback information can be uplink feedback information for HARQ (Hybrid Automatic Repeat reQuest).

In some embodiments, there may be various preset manners, such as a preset order of cells, a preset order of carrier frequencies, a preset chronological order and so on.

For example, counting according to a preset order of cells, and the preset order of cells is cell 1, cell 2, and cell 3. The uplink feedback information of cell 1 can be counted first, then the uplink feedback information of cell 2 can be counted, and then the uplink feedback information of cell 3 is counted. The count value corresponding to cell 1 to cell 3 is incremented according to the number of the recorded uplink feedback information.

In some embodiments, a time/frequency resource used to transmit the uplink feedback information corresponding to the downlink data for the user equipment can be determined according to DCI (Downlink Control Information).

For example, taking 7 DCIs as an example, the time/frequency resource used to transmit the uplink feedback information corresponding to downlink data indicated by DCI 1, DCI 3, and DCI 4 is first time/frequency resource 1, the time/frequency resource used to transmit the uplink feedback information corresponding to downlink data indicated by DCI 2, and DCI 6 is second time/frequency resource 2, the time/frequency resource used to transmit the uplink feedback information corresponding to downlink data indicated by DCI 5 is third time/frequency resource 3, and the time/frequency resource used to transmit the uplink feedback information corresponding to downlink data indicated by DCI 7 is fourth time/frequency resource 4.

In this case, based on the three set division manners, the corresponding count values are as follows.

Based on the first manner, where first time/frequency resource 1, second time/frequency resource 2, third time/frequency resource 3, and fourth time/frequency resource 4 belong to the same set, pieces of uplink feedback information indicated by DCI 1 to DCI 7 are counted continuously. Since the size of the uplink control information is 2 bits, count values are 1, 2, 3, 0, 1, 2, 3.

Based on the second manner, where first time/frequency resource 1 and second time/frequency resource 2 belong to set 1, pieces of uplink feedback information indicated by DCI 1 to DCI 4 and DCI 6 are counted continuously, and count values are 1, 2, 3, 0, 1. Based on the second manner, where third time/frequency resource 3 and fourth time/frequency resource 4 belong to set 2, pieces of uplink feedback information indicated by DCI 5 and DCI 7 are counted continuously, and count values are 1, 2. Further, according to the order of DCI 1 to DCI 7, the count values are sorted as 1, 2, 3, 0, 1, 1, 2.

Based on the third manner, where first time/frequency resource 1 belongs to set 1, pieces of uplink feedback information indicated by DCI 1, DCI 3, and DCI 4 are counted continuously, and count values are 1, 2, and 3. Based on the third manner, where second time/frequency resource 2 belongs to set 2, pieces of uplink feedback information indicated by DCI 2 and DCI 6 are counted continuously, and count values are 1, 2. Based on the third manner, where third time/frequency resource 3 and fourth time/frequency resource 4 belong to set 3, pieces of uplink feedback information indicated by DCI 5 and DCI 7 are continuously counted, and count values are 1, 2. Further, according to the order of DCI 1 to DCI 7, the count values are sorted as 1, 1, 2, 3, 1, 2, 2.

At step S13, when transmitting downlink scheduling information and/or uplink scheduling information, one or more current count values are transmitted to the user equipment.

In some embodiments, the current count value refers to a latest count value of the continuous counting of the uplink feedback information indicated by the DCI when the base station transmits the downlink scheduling information and/or the uplink scheduling information, and the number of the current count value is equal to the number of the sets. For example, based on the first manner, the number of current count value is one, and the current count value is 3. For example, based on the second manner, the number of current count values is two, and the current count values are 1 and 2. For example, based on the third manner, the number of current count values is three, and the current count values are 3, 2, and 2.

In some embodiments, the user equipment may determine, according to pre-configuration, a division rule and/or result with respect to the time/frequency resource set for the uplink control information, and may also receive, from the base station, the division rule and/or result with respect to the time/frequency resource set for the uplink control information. As an example, if the user equipment can determine the division result with respect to the time/frequency resource set for the uplink control information, the current count value is transmitted to the user equipment, such that the user equipment can determine, according to the current count value, the number of pieces of uplink feedback information to be transmitted by multiplexing the time/frequency resources for transmitting uplink data. Thus, it can be ensured that the number of pieces of uplink feedback information to be transmitted from the user equipment by multiplexing time/frequency resources for transmitting uplink data is the same as the number of pieces of downlink data which is transmitted from a base station and corresponds to the uplink feedback information, thereby ensuring good communication between the user equipment and the base station.

Figure 3:
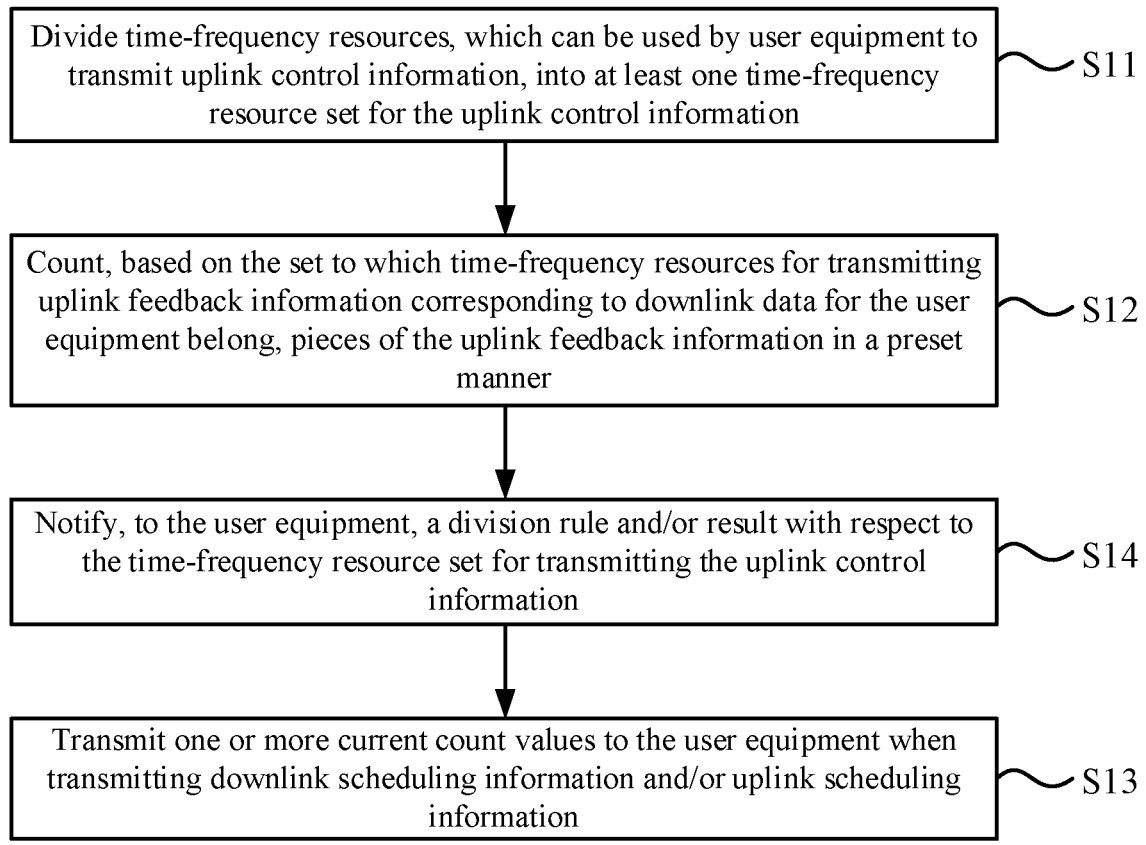
FIG. 3 is a schematic flowchart illustrating another method of indicating uplink feedback information according to some embodiments of the present disclosure.

FIG. 3 is a schematic flowchart illustrating another method of indicating uplink feedback information according to some embodiments of the present disclosure. As shown in FIG. 3, on the basis of the example shown in FIG. 1, the method of indicating uplink feedback information further includes step S14.

At step S14, a division rule and/or result with respect to the time/frequency resource set for transmitting the uplink control information are notified to the user equipment.

In some embodiments, the division rule and/or result with respect to the set can be configured by the base station as required. The base station may send the division rule with respect to the set to the user equipment, may send the division result with respect to the set to the user equipment, or may also send the division rule and result with respect to the set to the user equipment.

An execute order of step S14 can be configured as required, it can be executed prior to step S13, or can be executed simultaneously with step S13.

Figure 4:
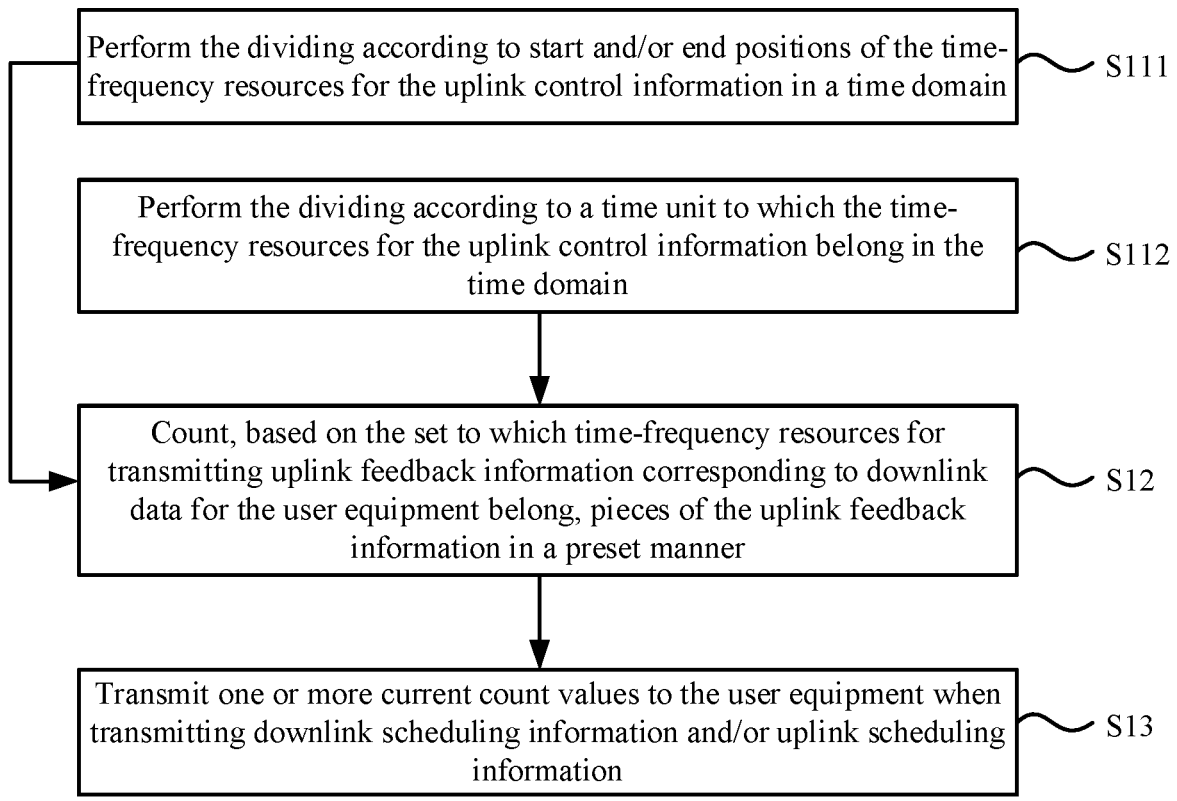
FIG. 4 is a schematic flowchart illustrating still another method of indicating uplink feedback information according to some embodiments of the present disclosure.

FIG. 4 is a schematic flowchart illustrating still another method of indicating uplink feedback information according to some embodiments of the present disclosure. As shown in FIG. 4, on the basis of the example shown in FIG. 1, dividing the time/frequency resources which can be used by the user equipment to transmit the uplink control information into at least one time/frequency resource set for the uplink control information includes step S111 and S112.

At step S111, the dividing is performed according to start and/or end positions of time/frequency resources for the uplink control information in a time domain.

Alternatively, at step S112, the dividing is preformed according to a time unit to which the time/frequency resources for the uplink control information belong in the time domain.

In some embodiments, there are many ways to perform the dividing.

For example, based on set division according to the start and/or end positions of the time/frequency resources for the uplink control information in the time domain at step S111, the time/frequency resources with the same start and/or end positions in the time domain are divided into one set. For example, based on the example shown in FIG. 2, first time/frequency resource 1 and second time/frequency resource 2 start at the same time, and third time/frequency resource 3 and fourth time/frequency resource start at the same time. Then first time/frequency resource 1 and second time/frequency resource 2 are divided into one set, and third time/frequency resource 3 and fourth time/frequency resource 4 are divided into one set.

For example, based on the set division according to the time unit to which the time/frequency resources of the uplink control information belong in the time domain at S112, the time/frequency resource belonging to the same time unit can be divided into one set. For example, based on the example shown in FIG. 2, the time unit is a time slot (it should be noted that the time unit can be configured as required), first time/frequency resource 1, second time/frequency resource 2, third time/frequency resource 3, and fourth time/frequency resource 4 belong to the same time slot, so first time/frequency resource 1, second time/frequency resource 2, third time/frequency resource 3, and fourth time/frequency resource 4 can be divided into one set.

Figure 5:
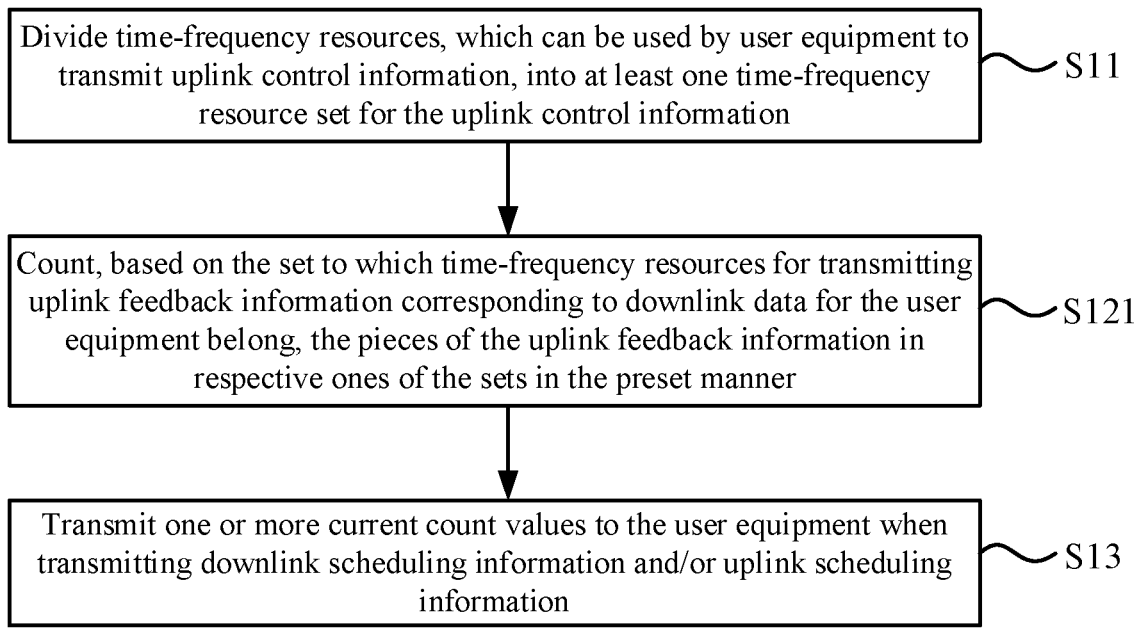
FIG. 5 is a schematic flowchart illustrating still another method of indicating uplink feedback information according to some embodiments of the present disclosure.

FIG. 5 is a schematic flowchart illustrating still another method of indicating uplink feedback information according to some embodiments of the present disclosure. As shown in FIG. 5, on the basis of the example shown in FIG. 1, counting the pieces of the uplink feedback information in the preset manner includes step S121.

At step S121, the pieces of the uplink feedback information in respective ones of the sets are counted in the preset manner.

In one example, the pieces of the uplink feedback information combined in respective ones of the sets can be counted separately. For example, based on the above second manner, where first time/frequency resource 1 and second time/frequency resource 2 belong to set 1, pieces of the uplink feedback information indicated by DCI 1 to DCI 4 and DCI 6 are counted continuously, and the count values are 1, 2, 3, 0, 1. Based on the above second manner, where third time/frequency resource 3 and fourth time/frequency resource 4 belong to set 2, pieces of the uplink feedback information indicated by DCI 5 and DCI 7 are counted continuously, and the count values are 1, 2. Further, according to the order of DCI 1 to DCI 7, the count values are sorted as 1, 2, 3, 0, 1, 1, 2.

In view of this, it can ensure that one or more current count value received by the user equipment correspond to a set to which the time/frequency resources belong, such that the user equipment quickly determines, according to the current count value, a number of pieces of downlink scheduling information included in the set corresponding to the current count value. For example, based on the example shown in FIG. 1, the downlink scheduling information is DCI, and the current count values received based on the above manner are 1 and 2, so it can be determined that 5 DCIs corresponding to set 1 and 2 DCIs corresponding set 2 need to be received.

Figure 6:
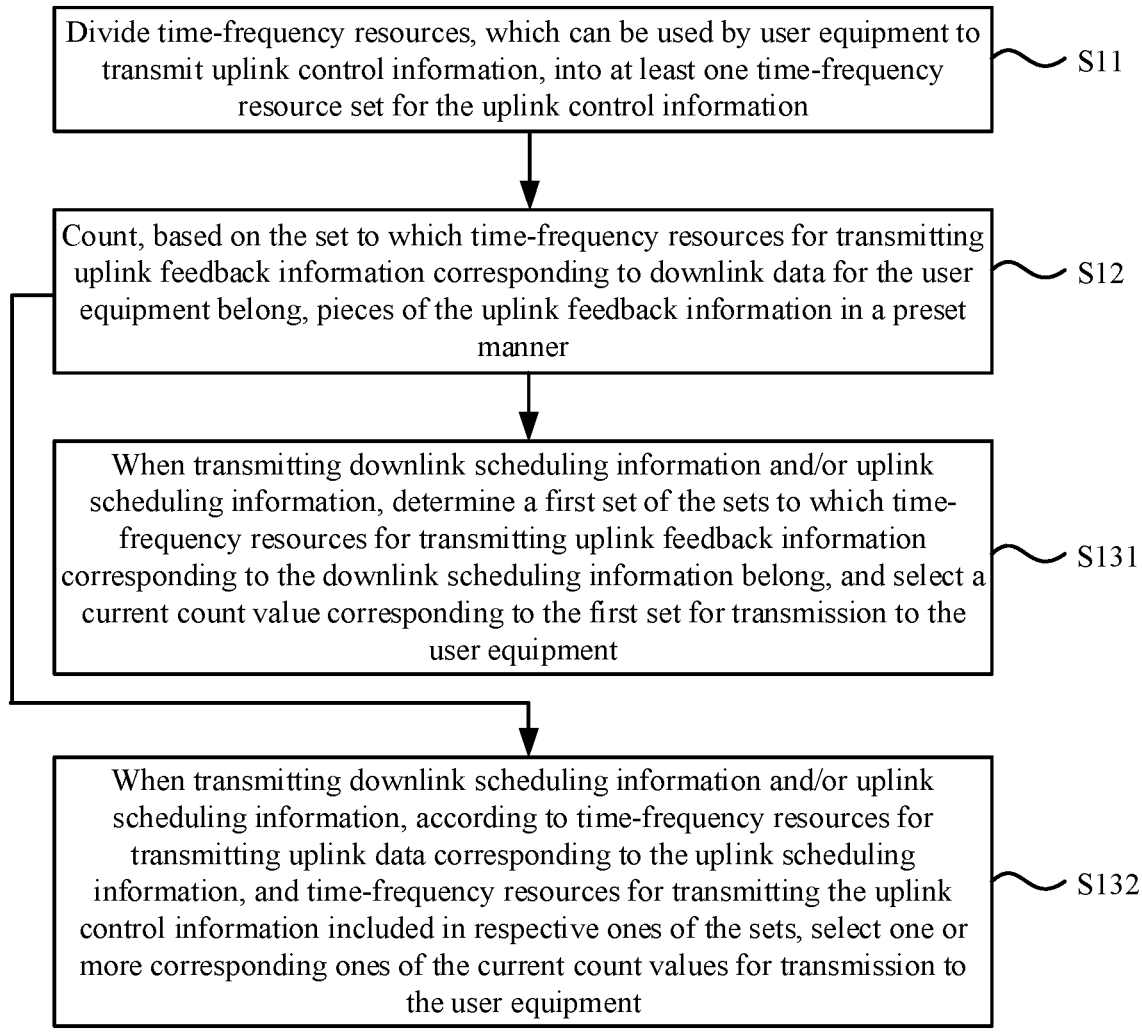
FIG. 6 is a schematic flowchart illustrating still another method of indicating uplink feedback information according to some embodiments of the present disclosure.

FIG. 6 is a schematic flowchart of still another method of indicating uplink feedback information according to some embodiments of the present disclosure. As shown in FIG. 6, on the basis of the example shown in FIG. 1, transmitting the current count value to the user equipment includes step S131 and/or S132.

At step S131, a first set of the sets to which the time/frequency resources for transmitting the uplink feedback information corresponding to the downlink scheduling information belong is determined, and a current count value corresponding to the first set is selected for transmission to the user equipment.

In some embodiments, after the downlink scheduling information is determined, the uplink feedback information corresponding to the downlink scheduling information may be determined, the first set of the divided sets to which the time/frequency resources for transmitting the uplink feedback information belong can be further determined, where the first set may be one or more sets. And further, the current count value corresponding to the first set can be transmitted to the user equipment. As for a set other than the first set, since the time/frequency resources for transmitting the uplink feedback information do not belong to such set, such set does not involve multiplexing the time/frequency resources for transmitting the uplink data, and there is no need to notify the user equipment such set, therefore it is beneficial to reducing an amount of data to be transmitted.

Additionally, or alternatively, at step S132, according to the time/frequency resources for transmitting uplink data corresponding to the uplink scheduling information, and time/frequency resources for transmitting the uplink control information included in respective ones of the sets, one or more corresponding ones of the current count values are selected for transmission to the user equipment.

In some embodiments, the uplink scheduling information is uplink scheduling information currently transmitted to the user equipment from the base station, and one or more current count values corresponding to a set including the uplink scheduling information can be selected to be transmitted to the user equipment, instead of transmitting the current count values corresponding to all of the sets to the user equipment.

Figure 7:
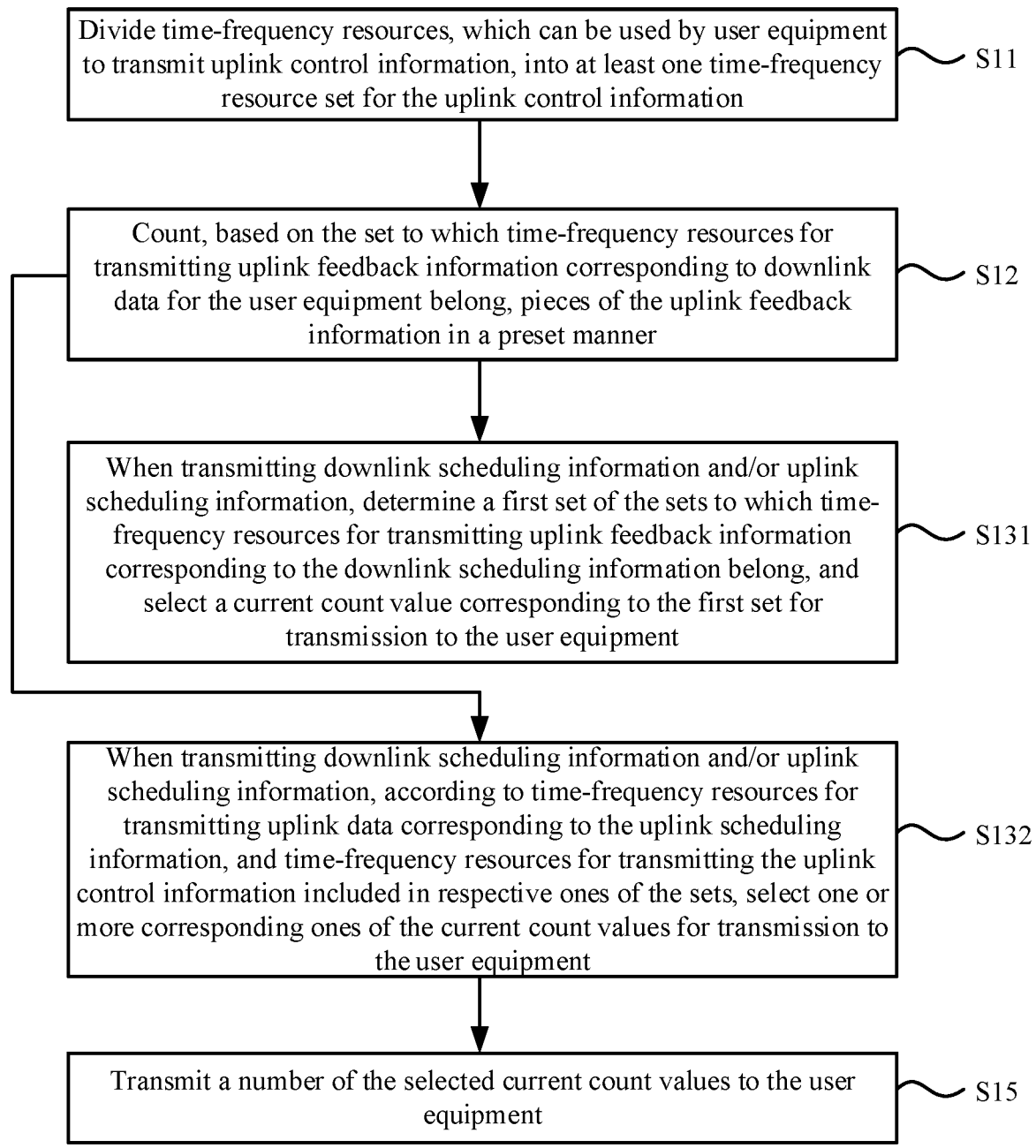
FIG. 7 is a schematic flowchart illustrating still another method of indicating uplink feedback information according to some embodiments of the present disclosure.

FIG. 7 is a schematic flowchart illustrating still another method of indicating uplink feedback information according to some embodiments of the present disclosure. As shown in FIG. 7, on the basis of the example shown in FIG. 6, when a plurality of ones of the current count values are selected, the method further includes step S15.

At step S15, a number of the selected current count values are transmitted to the user equipment.

In some embodiments, the number of the selected current count values can be transmitted to the user equipment, so that the user equipment can determine whether a count value has been missed according to the number and the received count values. When it is determined that a count value has been missed, the user equipment can send a request to the base station for requesting the base station to retransmit the current count value.

Figure 8:
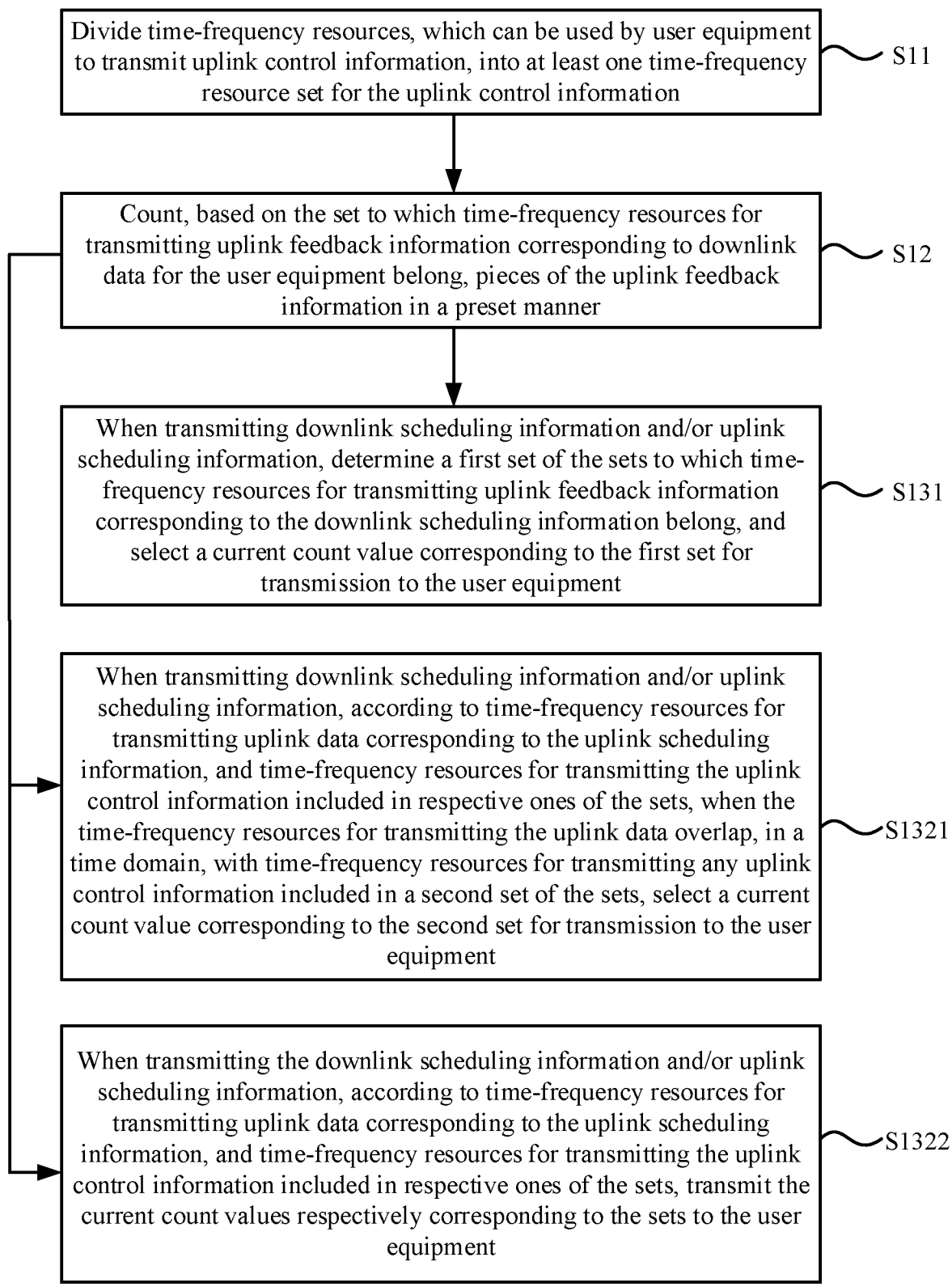
FIG. 8 is a schematic flowchart illustrating still another method of indicating uplink feedback information according to some embodiments of the present disclosure.

FIG. 8 is a schematic flowchart illustrating still another method of indicating uplink feedback information according to some embodiments of the present disclosure. As shown in FIG. 8, on the basis of the example shown in FIG. 6, selecting the one or more corresponding ones of the current count values for transmission to the user equipment includes step S1321 or S1322.

At step S1321, when the time/frequency resources for transmitting the uplink data overlap, in a time domain, with time/frequency resources for transmitting any uplink control information included in a second set of the sets, a current count value corresponding to the second set is selected for transmission to the user equipment. The second set is one or more sets of the divided set, and a set of the second set can be the same as or different from a set of the first set.

In some embodiments, in response to that the time/frequency resources for transmitting the uplink data corresponding to the uplink scheduling information are determined, the time/frequency resources for transmitting the uplink control information included in the divided different sets can be determined. When the time/frequency resources for transmitting the uplink control information included in the second set of the divided sets overlap with the time/frequency resources for transmitting the uplink data in the time domain, it is necessary to multiplex the time/frequency resources for transmitting the uplink data. When a set including time/frequency resources for transmitting the uplink control information does not overlap with the time/frequency resources for transmitting the uplink data, it is not necessary to multiplex the time/frequency resources for transmitting the uplink data. Therefore, it is possible to only transmit, to the user equipment, the current count value corresponding to the second set to which the overlapping time/frequency resources for the uplink control information belong, which is beneficial to reducing the amount of data to be transmitted.

Alternatively, at step S1322, the current count values respectively corresponding to the sets are transmitted to the user equipment.

In some embodiments, different from the example associated with step S1321, the count value corresponding to each set can be directly transmitted to the user equipment, so as to reduce the resources consumed by the base station for analysis.

Figure 9:
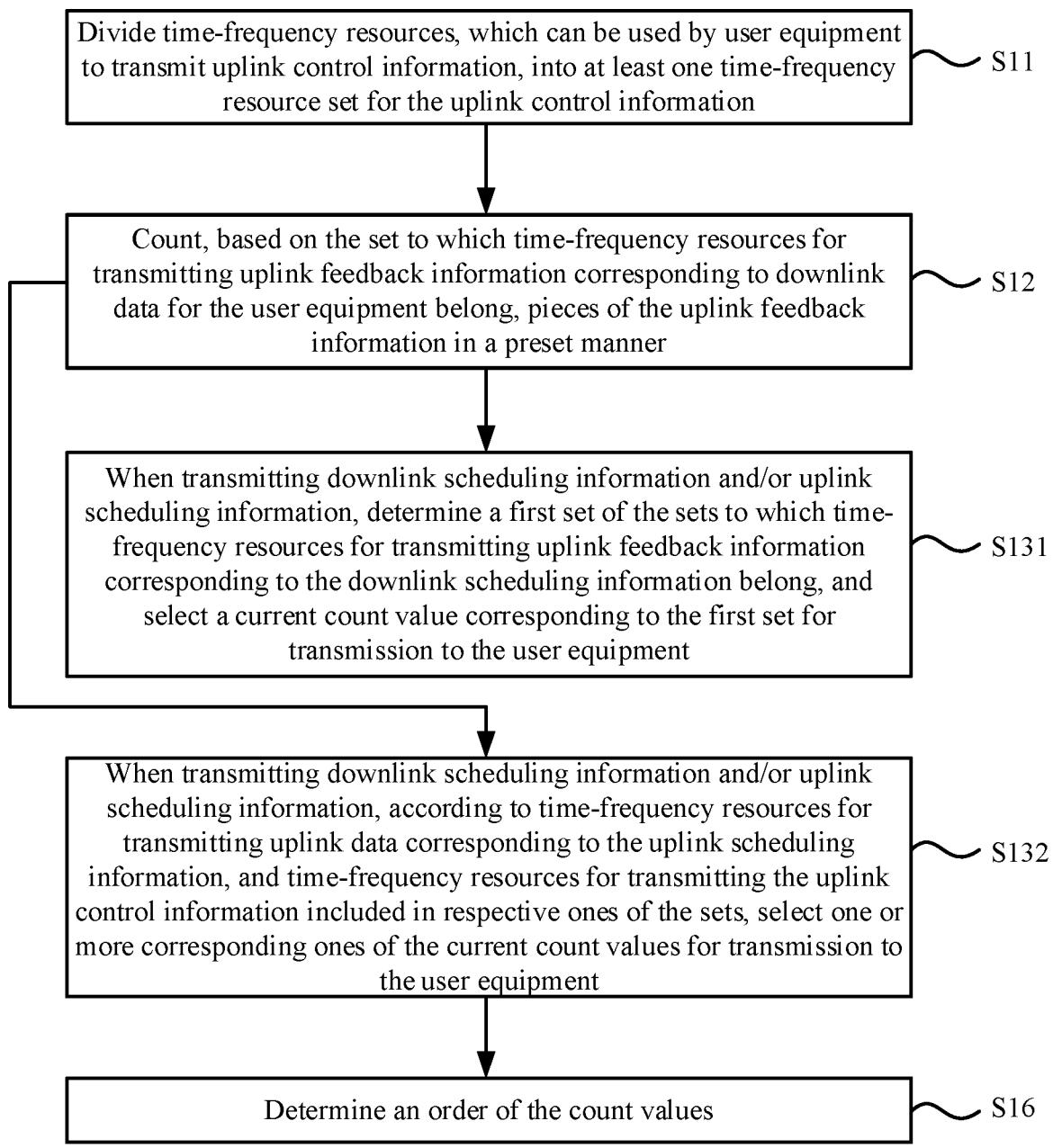
FIG. 9 is a schematic flowchart illustrating still another method of indicating uplink feedback information according to some embodiments of the present disclosure.

FIG. 9 is a schematic flowchart illustrating still another method of indicating uplink feedback information according to some embodiments of the present disclosure. As shown in FIG. 9, on the basis of the example shown in FIG. 6, when a plurality of ones of the current count values are selected, the method of indicating uplink feedback information further includes step S16.

At step S16, an order of the count values is determined.

In some embodiments, when there are a plurality of the current count values, the order of the plurality of the current count values may be transmitted to the user equipment, such that the user equipment can determine the order of the plurality of received current count values. For example, based on the third manner in the example shown in FIG. 1, three current count values, 3, 2 and 2, can be received.

Since the user equipment can determine the division rule and/or result with respect to the set, when the user equipment cannot determine the order of the three current count values, current count value 2 might be used as the first count value, and then the user equipment might decide that there are two pieces of uplink feedback information associated with the time/frequency resources corresponding to set 1. In fact, the base station requires that there are three pieces of uplink feedback information associated with the time/frequency resources corresponding to set 1 in the user equipment. Therefore, a problem in communication between the user equipment and the base station is caused. By transmitting the order of the current count values to the user equipment, it can be ensured that the user equipment can accurately determine the number of pieces of uplink feedback information associated with the time/frequency resources in a set corresponding to each of the current count values, thereby ensuring good communication between the user equipment and the base station.

The timing to perform step S16 can be set as required, step S16 can be performed prior to step S13, or can be performed simultaneously with step S13.

Figure 10:
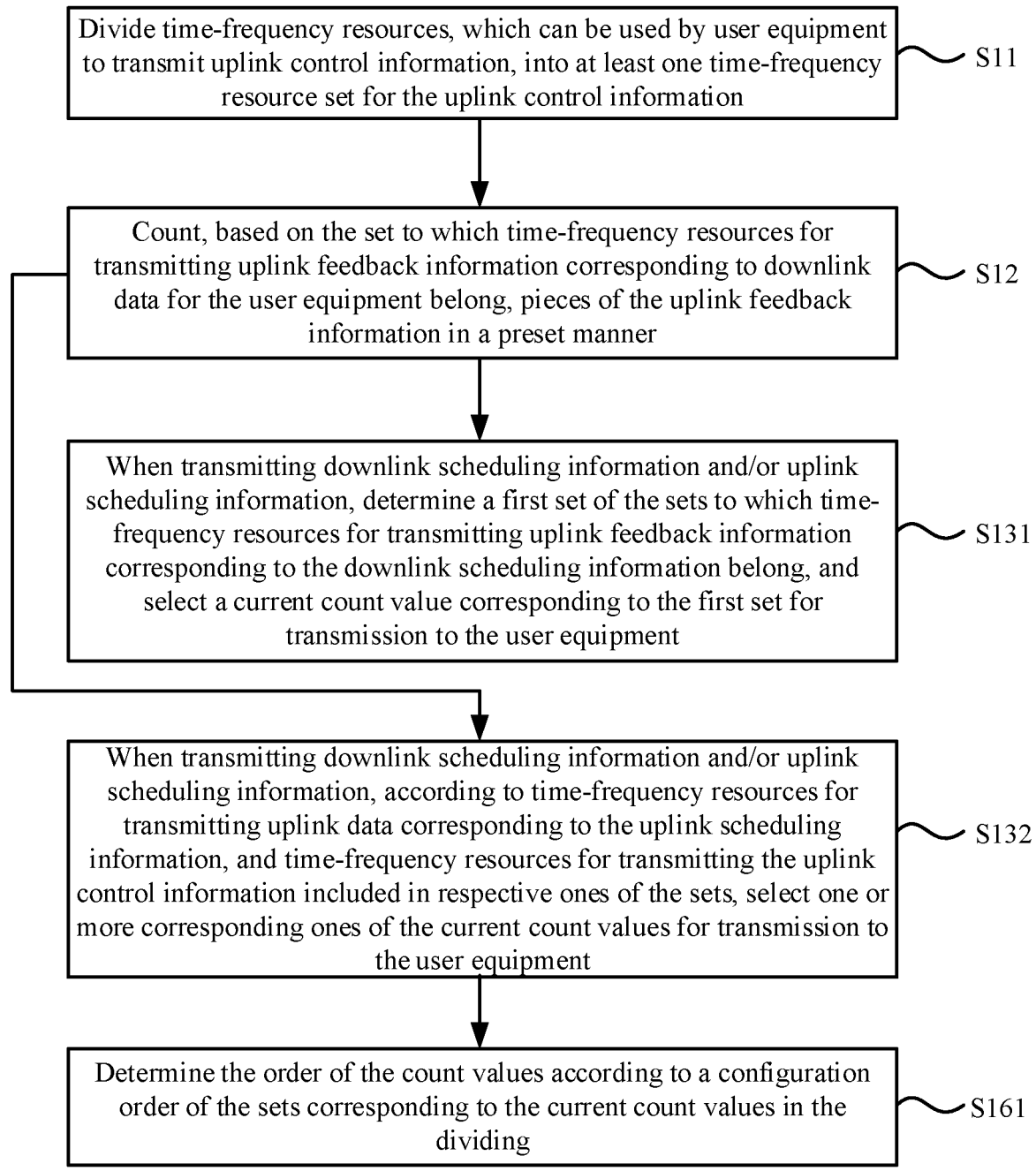
FIG. 10 is a schematic flowchart illustrating still another method of indicating uplink feedback information according to some embodiments of the present disclosure.

FIG. 10 is a schematic flowchart illustrating still another method of indicating uplink feedback information according to some embodiments of the present disclosure. As shown in FIG. 10, on the basis of the example shown in FIG. 9, determining the order of the count values includes step S161.

At step S161, the order of the count values is determined according to a configuration order of the sets corresponding to the current count values in the dividing.

In some embodiments, the order of the current count values can be the same as the configuration order when the sets are divided by the base station. For example, based on the third manner shown in FIG. 1, if the configuration order of sets is set 1, set 2, and set 3, then the order of the current count values is 3, 2, 2; if the configuration order of sets is set 2, set 3, set 1, then the order of the current count values is 2, 2, 3.

Figure 11:
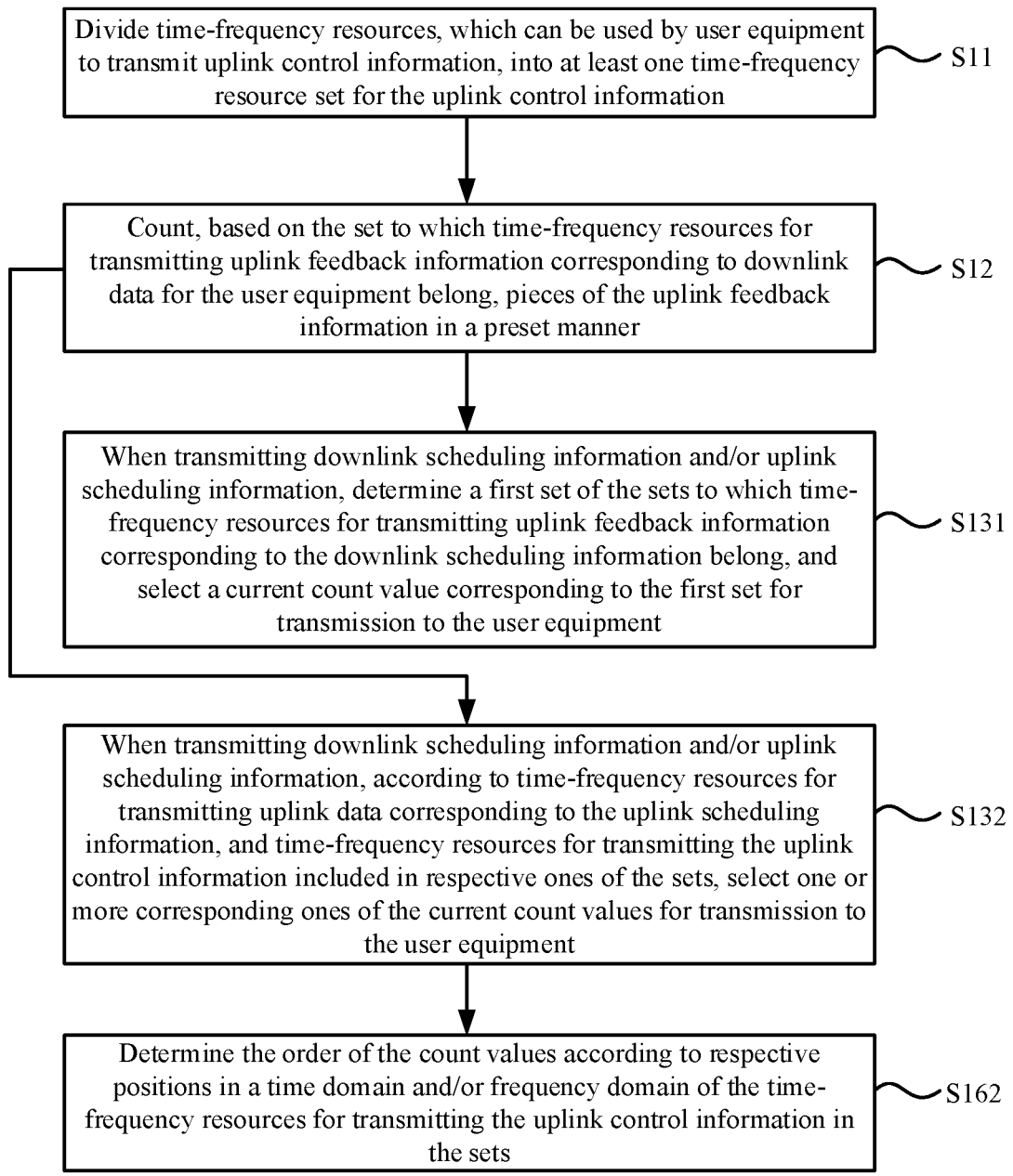
FIG. 11 is a schematic flowchart illustrating still another method of indicating uplink feedback information according to some embodiments of the present disclosure.

FIG. 11 is a schematic flowchart illustrating still another method of indicating uplink feedback information according to some embodiments of the present disclosure. As shown in FIG. 11, on the basis of the example shown in FIG. 9, determining the order of the count values includes step S162.

At step S162, the order of the count values is determined according to respective positions in a time domain and/or frequency domain of the time/frequency resources for transmitting the uplink control information in the sets.

In some embodiments, the order of the current count values can be the same as an order of the positions of the time/frequency resources used for transmitting the uplink control information in the sets in the time domain and/or in the frequency domain. For example, taking the positions of time/frequency resources used for transmitting the uplink control information in the sets in the time domain as an example, based on the second manner shown in FIG. 1, where set 1 includes first time/frequency resource 1 and second time/frequency resource 2, the positions of which in the time domain are more advanced compared to those of third time/frequency resource 3 and fourth time/frequency resource 4 included in set 2. Therefore, the determined order of the count values can be the current count value corresponding to set 1, and then the current count value corresponding to set 2.

It should be noted that the manner of determining the order of the count values is not limited to the above manners, which will not be elaborated herein.

Figure 12:
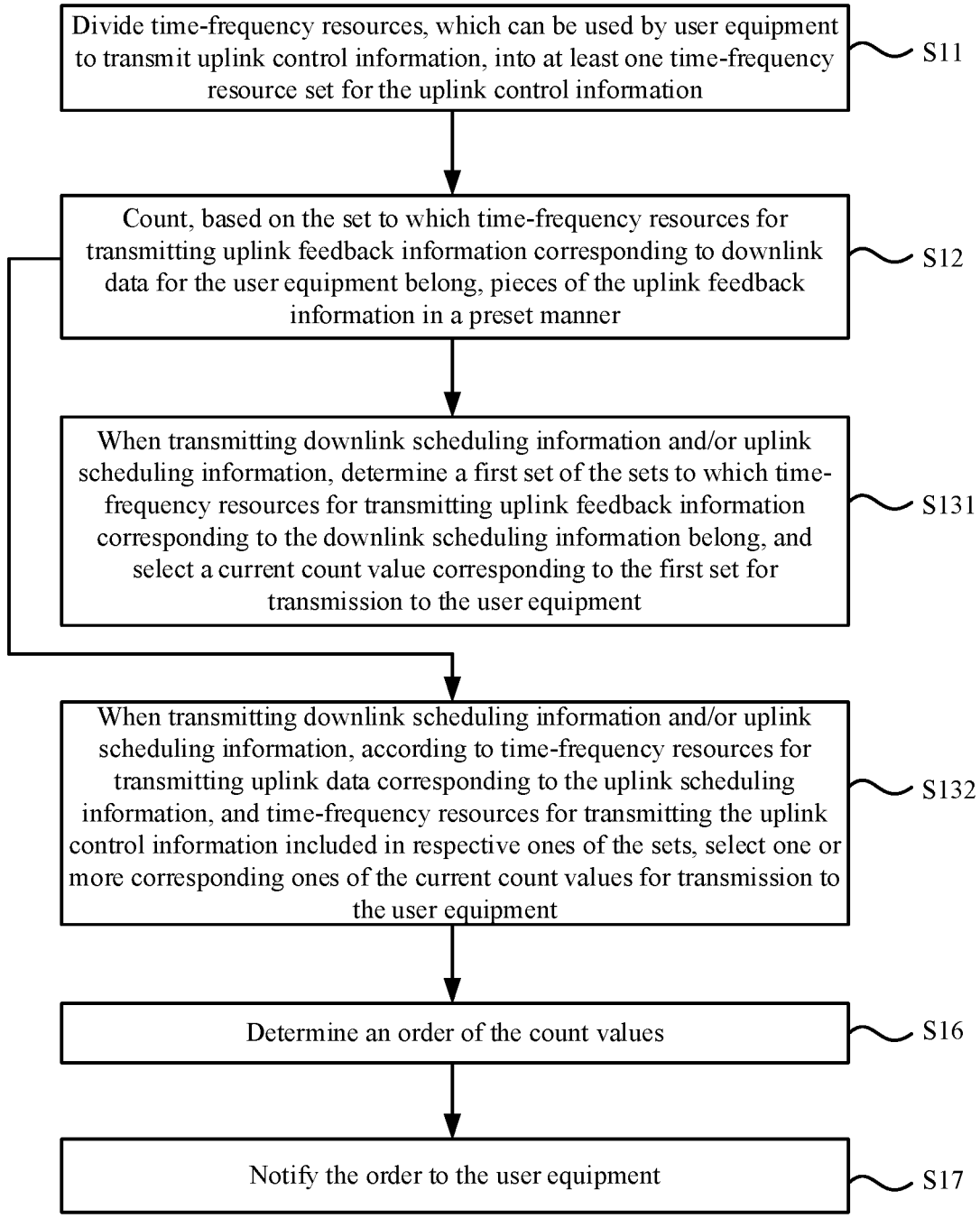
FIG. 12 is a schematic flowchart illustrating still another method of indicating uplink feedback information according to some embodiments of the present disclosure.

FIG. 12 is a schematic flowchart illustrating still another method of indicating uplink feedback information according to some embodiments of the present disclosure. As shown in FIG. 12, on the basis of the example shown in FIG. 9, the method of indicating uplink feedback information further includes step S17.

At step S17, the order is notified to the user equipment.

In some embodiments, the order of the count values can be notified by the base station to the user equipment.

In some embodiments, the order of the count values can be pre-configured to the user equipment, thus the notification from the base station is not necessary.

Figure 13:
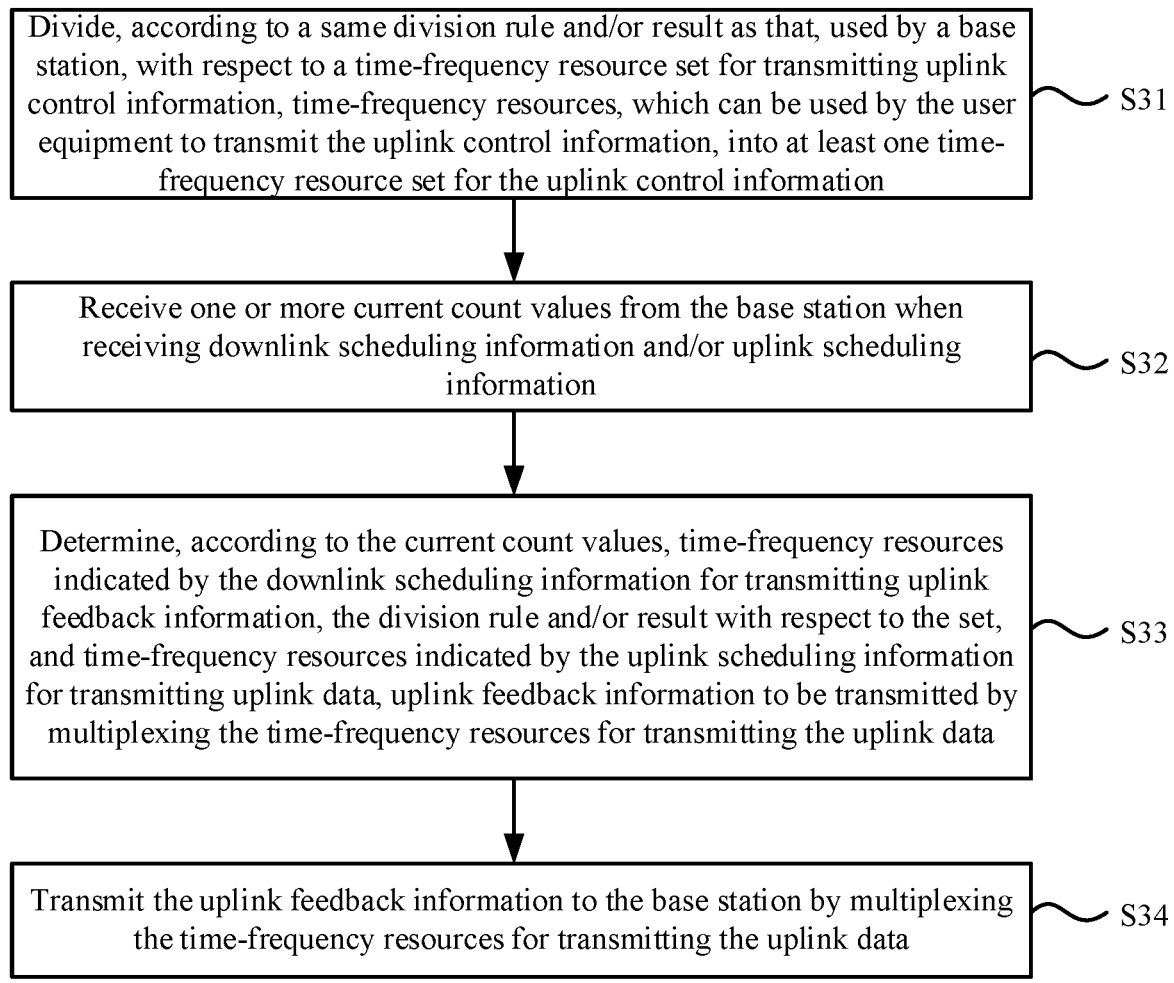
FIG. 13 is a schematic flowchart illustrating a method of transmitting uplink feedback information according to some embodiments of the present disclosure.

FIG. 13 is a schematic flowchart illustrating a method of transmitting uplink feedback information according to some embodiments of the present disclosure. The method of transmitting uplink feedback information shown in the example can be applicable to user equipment. As shown in FIG. 13, the method of transmitting uplink feedback information may include the following steps.

At step S31, according to a same division rule and/or result as that, used by a base station, with respect to a time/frequency resource set for transmitting uplink control information, time/frequency resources, which can be used by the user equipment to transmit the uplink control information, are divided into at least one time/frequency resource set for the uplink control information.

At step S32, when receiving downlink scheduling information and/or uplink scheduling information, one or more current count values from the base station are received.

At step S33, according to the current count value, time/frequency resources indicated by the downlink scheduling information for transmitting uplink feedback information, the division rule and/or result with respect to the set, and time/frequency resources indicated by the uplink scheduling information for transmitting uplink data, uplink feedback information to be transmitted by multiplexing the time/frequency resources for transmitting the uplink data is determined.

At step S34, the uplink feedback information is transmitted to the base station by multiplexing the time/frequency resources for transmitting the uplink data.

In some embodiments, the user equipment can divide time/frequency resources, which can be used by the user equipment to transmit the uplink control information, into a set, according to the same division rule and/or result as that, by the base station, for the time/frequency resources used for transmitting the uplink control information. Based on this, the time/frequency resources for transmitting the uplink control information included in a set divided by the base station correspond to the time/frequency resources for transmitting the uplink control information included in a set divided by the user equipment. For example, a first set divided by the base station includes the number, time domain positions, and frequency domain positions of the time/frequency resources for transmitting the uplink control information, which are respectively the same as the number, time domain positions, and frequency domain positions of the time/frequency resources for transmitting the uplink control information which are included in a first set divided by the user equipment.

In some embodiments, the user equipment can further receive the current count value from the base station, and according to the current count value, the user equipment can determine the number of pieces of uplink feedback information to be transmitted by multiplexing the time/frequency resources for transmitting the uplink data.

According to the time/frequency resources indicated by the downlink scheduling information for transmitting the uplink feedback information, the time/frequency resources for transmitting the uplink feedback information can be determined. According to the time/frequency resources indicated by the uplink scheduling information for transmitting the uplink data, the time/frequency resources for transmitting the uplink data can be determined. Therefore, it can be determined whether there is an overlap between the time/frequency resources for transmitting the uplink feedback information and the time/frequency resources for transmitting the uplink data, and determined a set corresponding to overlapped time/frequency resources for transmitting the uplink feedback information.

The uplink feedback information, corresponding to the time/frequency resources for transmitting the uplink feedback information which overlap with the time/frequency resources for transmitting the uplink data, may be determined as the uplink feedback information to be transmitted by multiplexing the time/frequency resources for transmitting the uplink data. Uplink feedback information, corresponding to each time/frequency resource for transmitting the uplink data in a set associated with the overlapped time/frequency resources for transmitting the uplink feedback information, may also be determined as the uplink feedback information to be transmitted by multiplexing the time/frequency resources for transmitting the uplink data.

Based on the content determined above, the user equipment can transmit the uplink feedback information, which is to be transmitted by multiplexing the time/frequency resources for transmitting the uplink data, on the time/frequency resources for transmitting the uplink data in the set divided by the base station, and the number of pieces of uplink feedback information transmitted is the same as the number of pieces of uplink feedback information required by the base station, thereby ensuring good communication between the user equipment and the base station.

Figure 14:
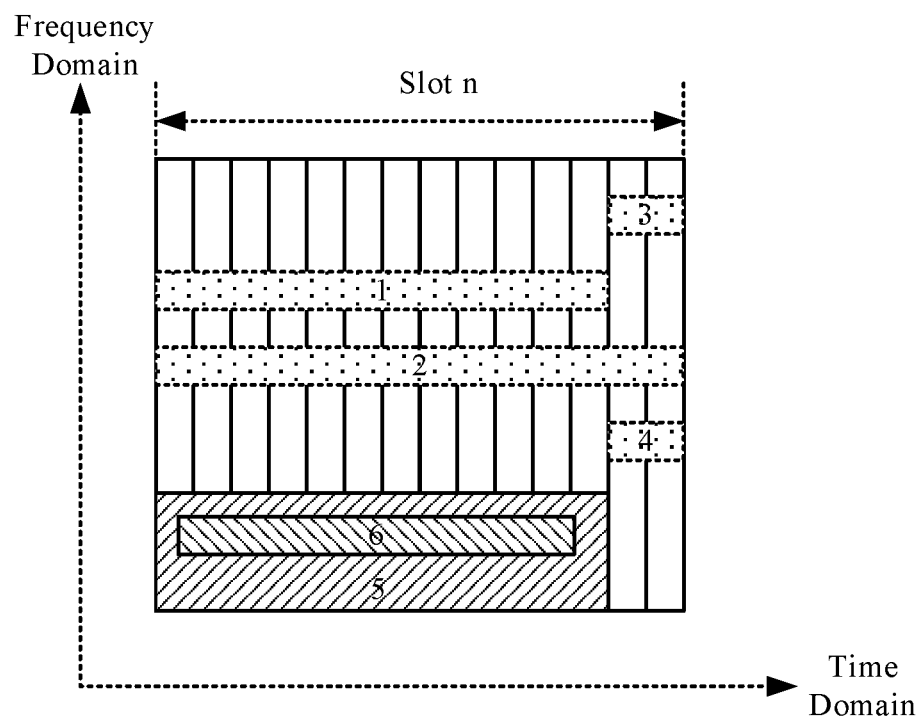
FIG. 14 is a schematic diagram illustrating transmitting uplink feedback information according to some embodiments of the present disclosure.

FIG. 14 is a schematic diagram illustrating transmitting uplink feedback information according to some embodiments of the present disclosure.

As shown in FIG. 14, for example, corresponding to the first manner in the example shown in FIG. 1, there is one divided set, and the current count value transmitted is 3. Then it can be determined that the number of pieces of uplink feedback information to be transmitted to the base station is 7. Since time/frequency resources for transmitting the uplink feedback information included in set 1 (that is, 1, 2, 3, and 4 in FIG. 14) overlap with time/frequency resource 5 for transmitting the uplink data (that is, there is an overlap between 1, 2 and 5), each piece of uplink feedback information corresponding to a time/frequency resource for transmitting the uplink feedback information in set 1 can be determined as the uplink feedback information to be transmitted by multiplexing the time/frequency resources for transmitting the uplink data. Therefore, uplink feedback information 6 (the number thereof is 7) to be transmitted by multiplexing the time/frequency resource for transmitting the uplink data can be transmitted to the based station on time/frequency resource 5 for transmitting the uplink data. In this way, no uplink feedback information is transmitted on first time/frequency resource 1, second time/frequency resource 2, third time/frequency resource 3, and fourth time/frequency resource 4.

Since one set is obtained by dividing according to the first manner, and the one set corresponds to only one current count value. It is not necessary to determine the order of the current count values. It is only necessary to sort the pieces of uplink feedback information 6 according to an order of DCIs. That is, in the time domain and/or frequency domain of time/frequency resource 5 for transmitting the uplink data, the pieces of uplink feedback information are sorted according to the order of DCI 1 to DCI 7.

When multiple sets are obtained by dividing in other manners, which correspond to multiple current count values, the user equipment can also receive the number of current count values and the order of the current count values which are from the base station. For example, FIG. 14 corresponds to the third manner in the example shown in FIG. 1, there are 3 divided sets, and the corresponding current count values are 3, 2, and 2. By determining an order of the current count values, the user equipment can determine that the current count values are arranged in the order of 3, 2, and 2, and then, according to the division result with respect to the set, the user equipment can determine that the pieces of uplink feedback information in set 1 correspond to DCI 1, DCI 3, and DCI 4, the pieces of uplink feedback information in set 2 correspond to DCI 2 and DCI 6, the pieces of uplink feedback information in set 3 correspond to DCI 5 and DCI 7. Thus, the pieces of uplink feedback information can be sorted in the time domain and/or frequency domain of time/frequency resource 5 for transmitting the uplink data, that is, the pieces of the uplink feedback information can be sorted corresponding to the order of DCI 1, DCI 3, DCI 4, DCI 2, DCI 6, DCI 5, and DCI 7 respectively.

Figure 15:
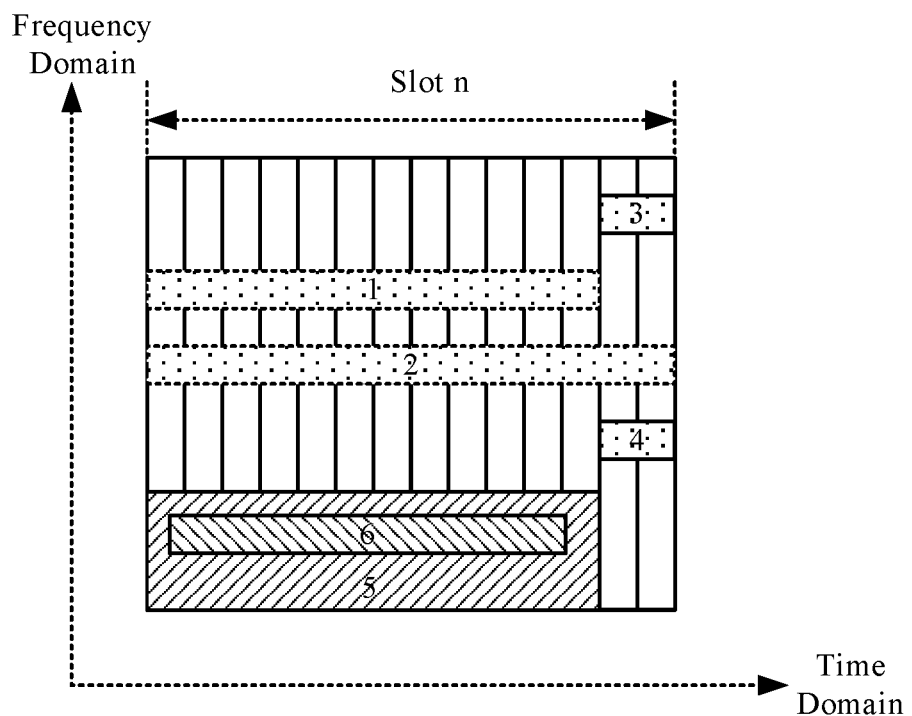
FIG. 15 is another schematic diagram illustrating transmitting uplink feedback information according to some embodiments of the present disclosure.

FIG. 15 is another schematic diagram illustrating transmitting uplink feedback information according to some embodiments of the present disclosure.

As shown in FIG. 15, for example, corresponding to the second manner in the example shown in FIG. 1, there are 2 divided sets, and the transmitted current count values are 1 and 2. Then, it can be determined that the number of pieces of uplink feedback information to be transmitted to the base station is 7. Since time/frequency resources for transmitting uplink feedback information included in set 1 (that is, 1 and 2 in FIG. 15) overlap with time/frequency resource 5 for transmitting the uplink data, and time/frequency resources for transmitting uplink feedback information included in set 2 (that is, 3 and 4 in FIG. 15) do not overlap with time/frequency resource 5 for transmitting the uplink data, uplink feedback information, corresponding to the time/frequency resources for transmitting the uplink feedback information included in set 1 (that is, 1 and 2 in FIG. 15) which overlap with the time/frequency resource for transmitting the uplink data, can be determined as the uplink feedback information to be transmitted by multiplexing the time/frequency resources for transmitting the uplink data. Therefore, uplink feedback information 6 (the number thereof is 5) to be transmitted by multiplexing the time/frequency resource for transmitting the uplink data can be transmitted to the based station on time/frequency resource 5 for transmitting the uplink data. Thus, no uplink feedback information is transmitted on first time/frequency resource 1 and second time/frequency resource 2.

For third time/frequency resource 3 and fourth time/frequency resource 4 in set 2, there is no overlap in the time domain with time/frequency resource 5 for transmitting uplink data, so there is no need to transmit the uplink feedback information corresponding to third time/frequency resource 3 and fourth time/frequency resource 4 by multiplexing time/frequency resource 5 for transmitting the uplink data. Rather, the uplink feedback information corresponding to third time/frequency resource 3 and fourth time/frequency resource 4 can be transmitted in a time division multiplexed manner.

Figure 16:
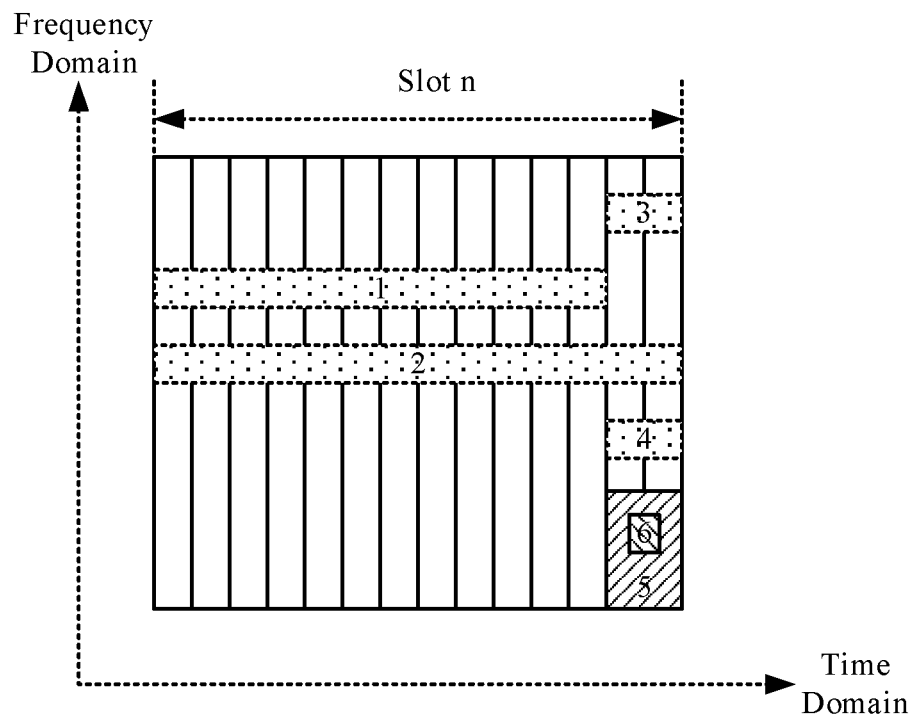
FIG. 16 is still another schematic diagram illustrating transmitting uplink feedback information according to some embodiments of the present disclosure.

FIG. 16 is still another schematic diagram illustrating transmitting uplink feedback information according to some embodiments of the present disclosure.

As shown in FIG. 16, for example, corresponding to the first manner in the example shown in FIG. 1, there is one divided set, and the current count value transmitted is 3. Then, it can be determined that the number of pieces of uplink feedback information to be transmitted to the base station is 7. Since time/frequency resources for transmitting uplink feedback information included in set 1 overlap with time/frequency resource 5 for transmitting uplink data (that is, 2, 3 and 4 in FIG. 16), each piece of uplink feedback information corresponding to a time/frequency resource for transmitting the uplink feedback information in set 1 can be determined as the uplink feedback information to be transmitted by multiplexing the time/frequency resources for transmitting uplink data. Therefore, uplink feedback information 6 (the number thereof is 7) to be transmitted by multiplexing the time/frequency resource for transmitting the uplink data can be transmitted to the based station on time/frequency resource 5 for transmitting the uplink data. Thus, no uplink feedback information is required to be transmitted on first time/frequency resource 1, second time/frequency resource 2, third time/frequency resource 3, and fourth time/frequency resource 4.

Figure 17:
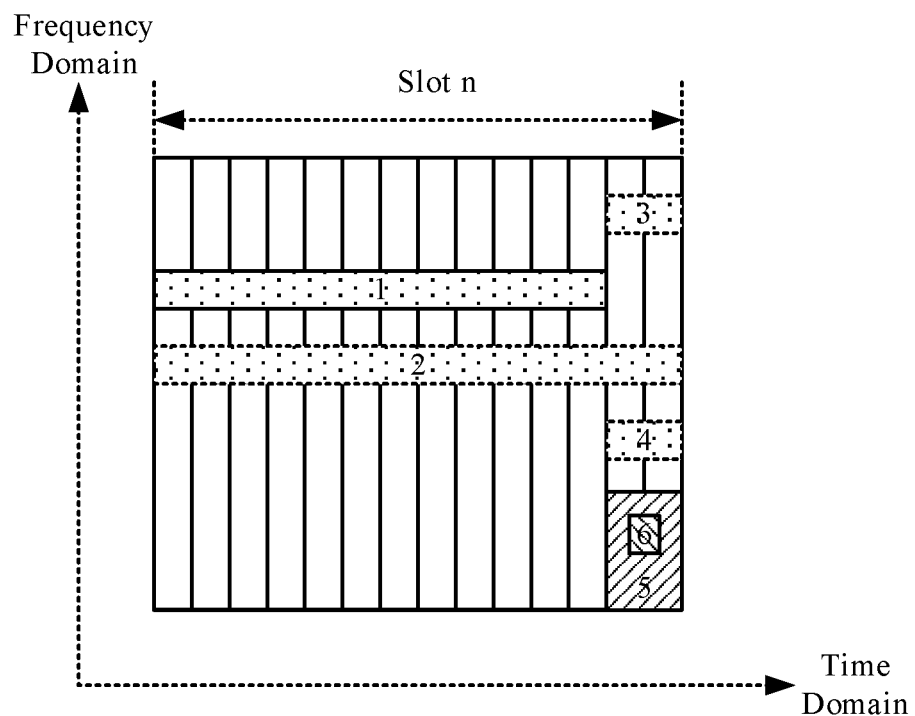
FIG. 17 is still another schematic diagram illustrating transmitting uplink feedback information according to some embodiments of the present disclosure.

FIG. 17 is still another schematic diagram illustrating transmitting uplink feedback information according to some embodiments of the present disclosure.

As shown in FIG. 17, for example, corresponding to the third manner in the example shown in FIG. 1, there are 3 divided sets, and the current count values transmitted are 3, 2 and 2. Then, it can be determined that the number of pieces of uplink feedback information to be transmitted to the base station is 7. Since time/frequency resource for transmitting uplink feedback information included in set 1 (that is, 1 in FIG. 17) does not overlap with time/frequency resource 5 for transmitting the uplink data, time/frequency resource for transmitting uplink feedback information included in set 2 (that is, 2 in FIG. 17) overlaps with time/frequency resource 5 for transmitting the uplink data, and time/frequency resources for transmitting uplink feedback information included in set 3 (that is, 3 and 4 in FIG. 17) overlap with time/frequency resource 5 for transmitting the uplink data, uplink feedback information, corresponding to the time/frequency resources for transmitting uplink feedback information include in set 2 and set 3 (that is, 2, 3 and 4 in FIG. 17) which overlap with time/frequency resource 5 for transmitting the uplink data, can be determined as the uplink feedback information to be transmitted by multiplexing the time/frequency resources for transmitting uplink data. Therefore, uplink feedback information 6 (the number thereof is 4) to be transmitted by multiplexing the time/frequency resource for transmitting the uplink data can be transmitted to the based station on time/frequency resource 5 for transmitting the uplink data. Thus, no uplink feedback information to be transmitted on second time/frequency resource 2, third time/frequency resource 3 and fourth time/frequency resource 4.

For first time/frequency resource 3 in set 1, there is no overlap in the time domain with time/frequency resource 5 for transmitting uplink data, so there is no need to transmit the uplink feedback information corresponding to first time/frequency resource 1 by multiplexing time/frequency resource 5 for transmitting the uplink data.

In some embodiments, the division rule and/or result are pre-configured and/or received from a base station when receiving the downlink scheduling information and/or the uplink scheduling information.

Figure 18:
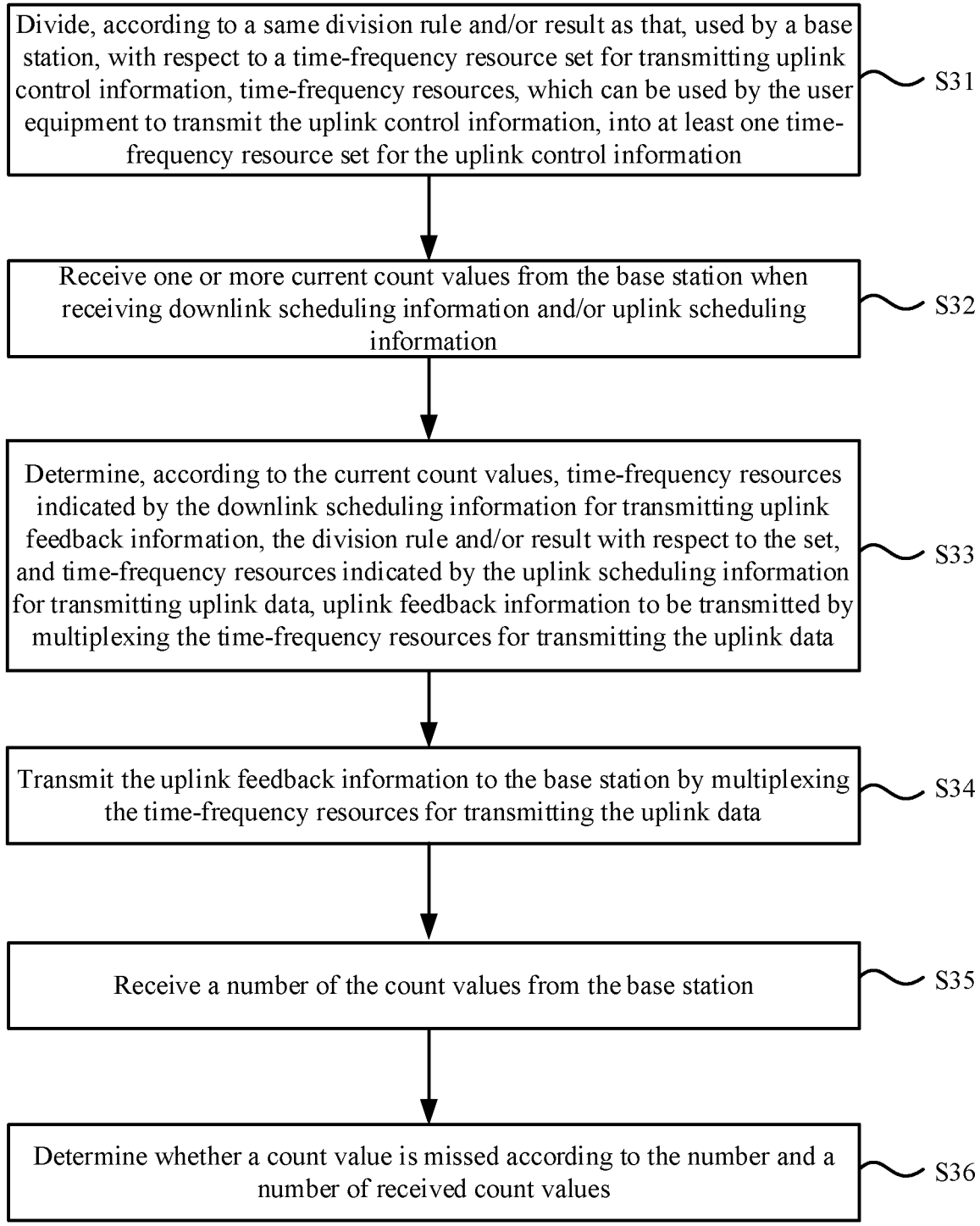
FIG. 18 is a schematic flowchart illustrating another method of transmitting uplink feedback information according to some embodiments of the present disclosure.

FIG. 18 is a schematic flowchart illustrating another method of transmitting uplink feedback information according to some embodiments of the present disclosure. As shown in FIG. 18, on the basis of the example shown in FIG. 13, if a number of the count values is more than one, the method of transmitting uplink feedback information further includes steps S35 and S36.

At step S35, a number of the count values from the base station is received.

At step S36, it is determined whether a count value is missed according to the number and a number of received count values.

In some embodiments, the user equipment can count the number of the current count values received and compare it with the number from the base station. If the number of the current count values is less than (generally there is no case of being greater than) the number from the base station, it can be determined that one or more current count values are missed. In this way, a request can be sent to the base station for requesting the base station to resend the current count values.

In some embodiments, after requesting the base station to resend the current count values, if the user equipment receives the current count values resent by the base station, the user equipment can determine the uplink feedback information to be transmitted by multiplexing the time/frequency resources for transmitting the uplink data, according to the resent current count values, the time/frequency resources indicated by the downlink scheduling information for transmitting the uplink feedback information, the division rule and/or result with respect to the set, and the time/frequency resources indicated by the uplink scheduling information for transmitting the uplink data.

In some embodiments, if the number of the count values is more than one, the method further includes the following step.

An order of the count values from the base station is received.

According to the current count values, the time/frequency resources indicated by the downlink scheduling information for transmitting the uplink feedback information, the division rule and/or result with respect to the set, and the time/frequency resources indicated by the uplink scheduling information for transmitting the uplink data, determining the uplink feedback information to be transmitted by multiplexing the time/frequency resources for transmitting the uplink data includes the followings.

The uplink feedback information to be transmitted by multiplexing the time/frequency resources for transmitting the uplink data is determined according to the time/frequency resources indicated by the downlink scheduling information for transmitting the uplink feedback information, the division rule and/or result with respect to the set, the time/frequency resources indicated by the uplink scheduling information for transmitting the uplink data, and the order.

Figure 19:
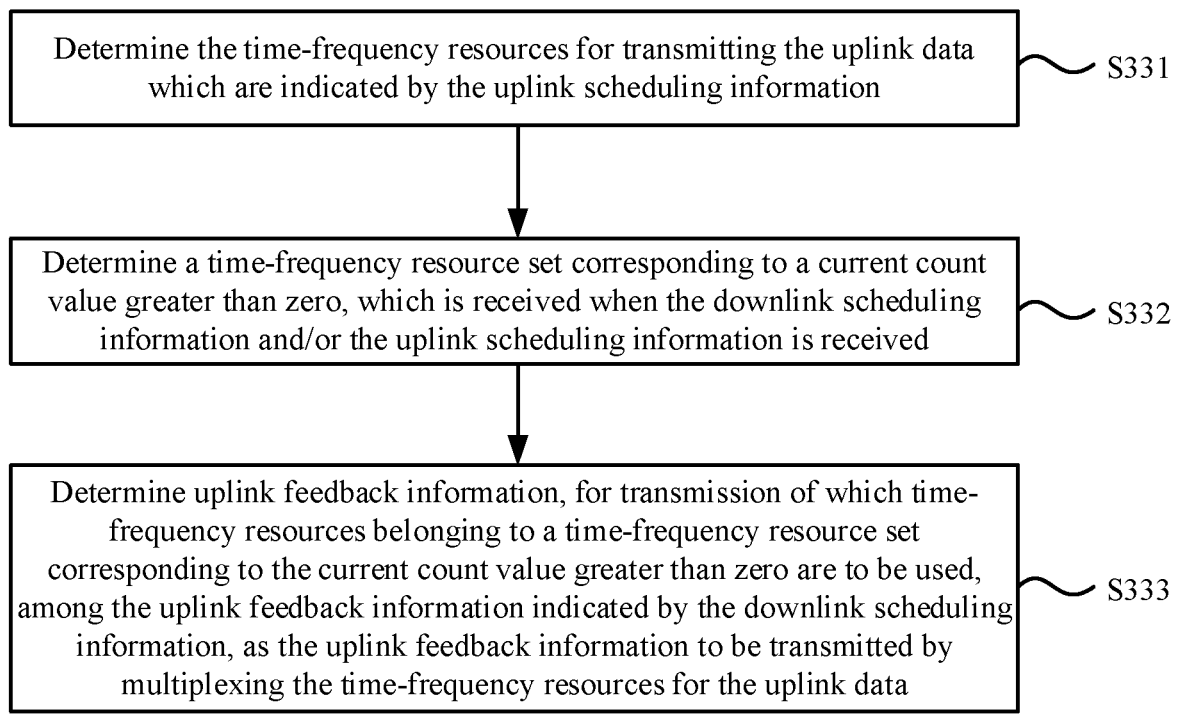
FIG. 19 is a schematic flowchart illustrating determining uplink feedback information to be transmitted by multiplexing a time/frequency resource for transmitting uplink data according to some embodiments of the present disclosure.

FIG. 19 is a schematic flowchart illustrating determining uplink feedback information to be transmitted by multiplexing time/frequency resources for transmitting uplink data according to some embodiments of the present disclosure. As shown in FIG. 19, on the basis of the example shown in FIG. 13, determining the uplink feedback information to be transmitted by multiplexing the time/frequency resources for transmitting the uplink data includes steps S331-S333.

At step S331, the time/frequency resources indicated by the uplink scheduling information for transmitting the uplink data are determined.

At step S332, a time/frequency resource set corresponding to a current count value greater than zero is determined, the time/frequency resource set is received when the downlink scheduling information and/or the uplink scheduling information is received.

At step S333, among the uplink feedback information indicated by the downlink scheduling information, uplink feedback information, of which time/frequency resources for transmission belonging to a time/frequency resource set corresponding to the current count value greater than zero are to be used, is determined as the uplink feedback information by multiplexing the time/frequency resources for the uplink data.

In some embodiments, if the current count value is equal to 0, it is necessary to determine whether the current count value is really equal to 0 according to the actual situation. For example, it can be detected whether receives the downlink scheduling information indicating uplink feedback information. If the downlink scheduling information is received, it can be determined that the current count value is not 0, but an integer multiple of 4. If the downlink scheduling information is not received, it can be determined that the count value is indeed 0.

In some embodiments, for a set corresponding to a current count value greater than 0, it can be determined that the base station has indicated that uplink feedback information corresponding to a resource used for the uplink feedback information in the set multiplexes the time/frequency resources for transmitting the uplink data. For a set corresponding to the current count value which is equal to 0, it can be determined that the base station has not indicated that the uplink feedback information corresponding to a resource used for the uplink feedback information in the set multiplexes the time/frequency resources for transmitting the uplink data. Therefore, only the uplink feedback information, for the transmission of which time/frequency resources belonging to the time/frequency resource set corresponding to the current count value greater than zero are to be used, is determined as the uplink feedback information to be transmitted by multiplexing the time/frequency resources for the uplink data, and other uplink feedback information can be transmitted to the base station in other ways.

Figure 20:
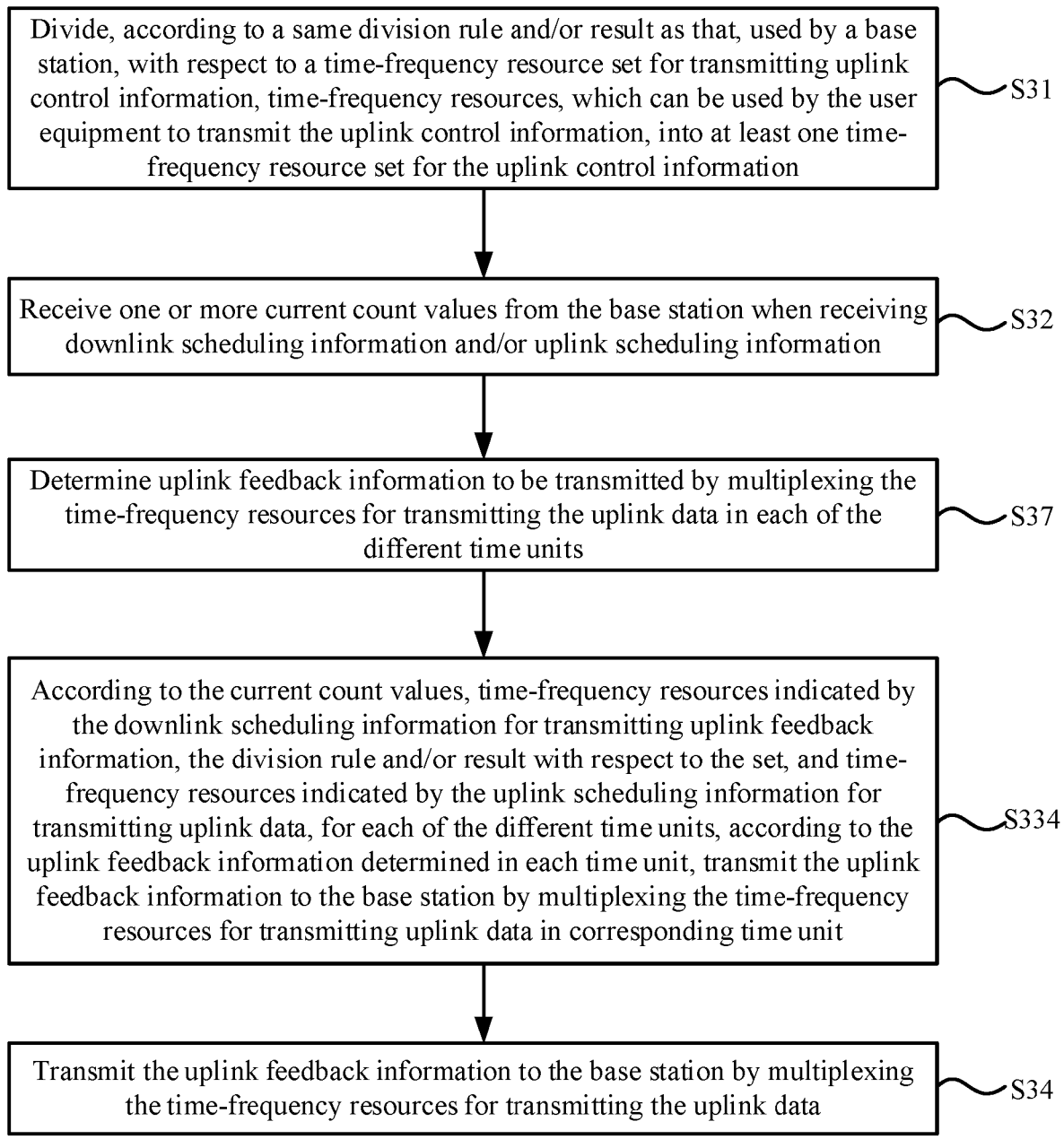
FIG. 20 is a schematic flowchart illustrating still another method of transmitting uplink feedback information according to some embodiments of the present disclosure.

FIG. 20 is a schematic flowchart illustrating still another method of transmitting uplink feedback information according to some embodiments of the present disclosure. As shown in FIG. 20, on the basis of the example shown in FIG. 13, if the time/frequency resources for transmitting uplink control information are in different time units, before transmitting the uplink feedback information to the base station by multiplexing the time/frequency resources for transmitting the uplink data, the method of transmitting uplink feedback information includes step S37.

At step S37, uplink feedback information to be transmitted by multiplexing time/frequency resources for transmitting uplink data in each of the different time units is determined.

Transmitting the uplink feedback information to the base station by multiplexing time/frequency resources for transmitting the uplink data includes step S334.

At step S334, for each of the different time units, according to the uplink feedback information determined in each time unit, the uplink feedback information is transmitted to the base station by multiplexing time/frequency resources for transmitting uplink data in corresponding time unit. The corresponding time unit refers to a time unit corresponding to the determined uplink feedback information.

In some embodiments, if the time/frequency resources for transmitting uplink control information are in different time units, it can be determined that, in each time unit, the uplink feedback information is transmitted by multiplexing the time/frequency resources used for transmitting uplink data. Furthermore, in each time unit, the uplink feedback information can be transmitted by multiplexing the time/frequency resources used for transmitting uplink data according to the multiplexing situation of time/frequency resources used for transmitting the uplink feedback information and the uplink data in the respective time unit. For example, for a first time unit in the different time units, the uplink feedback information can be transmitted by multiplexing the time/frequency resources used for transmitting uplink data according to the multiplexing situation of time/frequency resources used for transmitting the uplink feedback information and the uplink data in the first time unit. For a second time unit in the different time units, the uplink feedback information can be transmitted by multiplexing the time/frequency resources used for transmitting uplink data according to the multiplexing situation of time/frequency resources used for transmitting the uplink feedback information and the uplink data in the second time unit.

Figure 21:
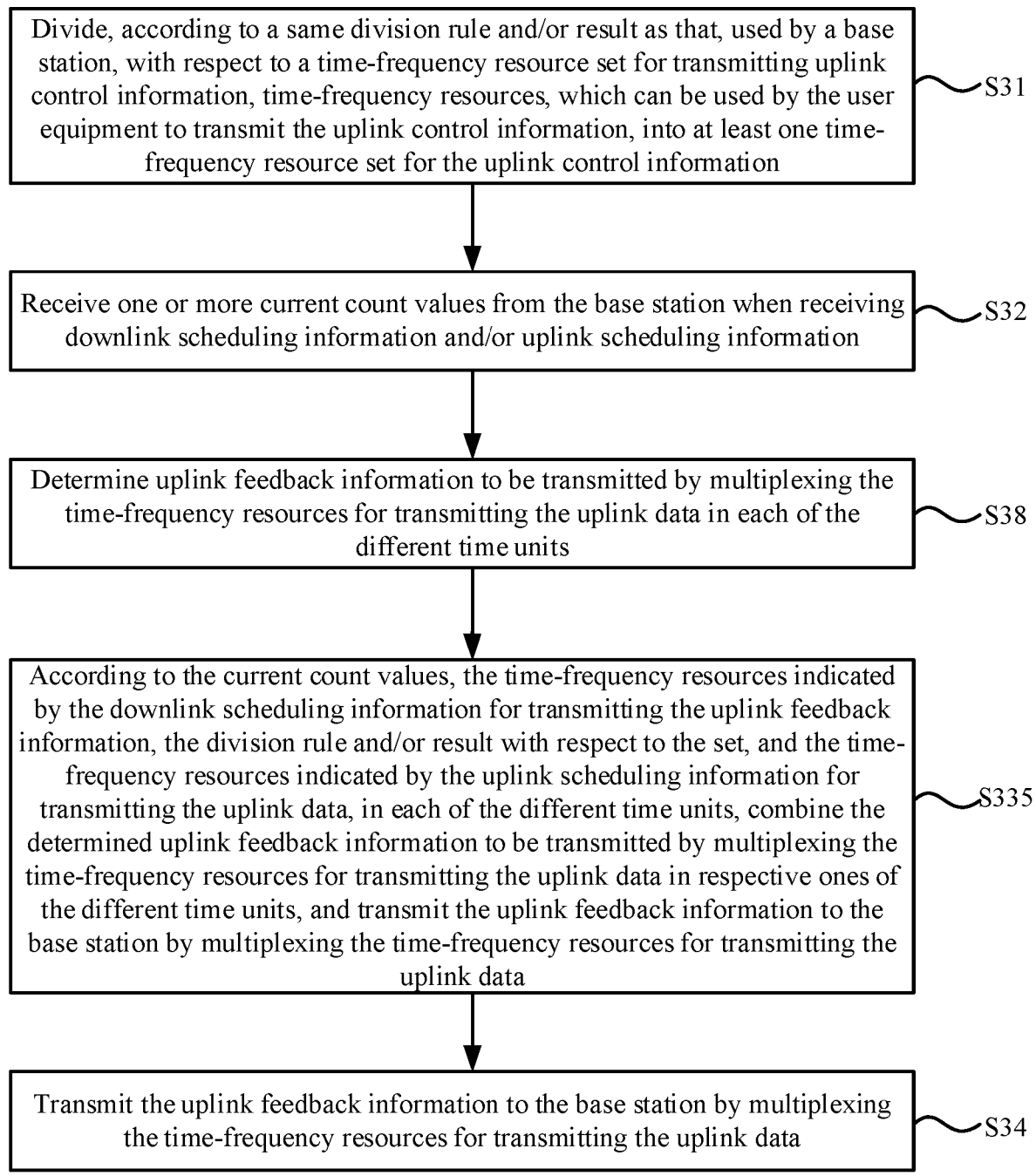
FIG. 21 is a schematic flowchart illustrating still another method of transmitting uplink feedback information according to some embodiments of the present disclosure.

FIG. 21 is a schematic flowchart illustrating still another method of transmitting uplink feedback information according to some embodiments of the present disclosure. As shown in FIG. 21, on the basis of the example shown in FIG. 13, if the time/frequency resources for transmitting uplink control information are in different time units, before transmitting the uplink feedback information to the base station by multiplexing the time/frequency resources for transmitting the uplink data, the method of transmitting uplink feedback information includes step S38.

At step S38, uplink feedback information to be transmitted by multiplexing time/frequency resources for transmitting uplink data in each of the different time units is determined.

Transmitting the uplink feedback information to the base station by multiplexing time/frequency resources for transmitting the uplink data includes step S335.

At step S335, in each of the different time units, the determined uplink feedback information to be transmitted by multiplexing the time/frequency resources for transmitting the uplink data is combined in respective ones of the different time units, and the uplink feedback information is transmitted to the base station by multiplexing the time/frequency resources for transmitting the uplink data.

In some embodiments, if the time/frequency resources for transmitting uplink control information are in different time units, it can be determined that, in each time unit, the uplink feedback information to be transmitted by multiplexing the time/frequency resources used for transmitting uplink data. Then, uplink feedback information to be multiplexed with time/frequency resources used for transmitting uplink data determined in each time unit is combined. Then, in each time unit, the combined uplink feedback information is transmitted to the base station by multiplexing the time/frequency resources used for transmitting uplink data. For example, for a first time unit in different time units, according to the multiplexing situation of the time/frequency resources used for transmitting the uplink feedback information and the uplink data in the first time unit and a second time unit, the uplink feedback information is transmitted by multiplexing the time/frequency resources used for transmitting uplink data. For the second time unit in different time units, according to the multiplexing situation of the time/frequency resources used for transmitting the uplink feedback information and the uplink data in the first time unit and the second time unit, the uplink feedback information is transmitted by multiplexing the time/frequency resources used for transmitting uplink data.

Figure 22:
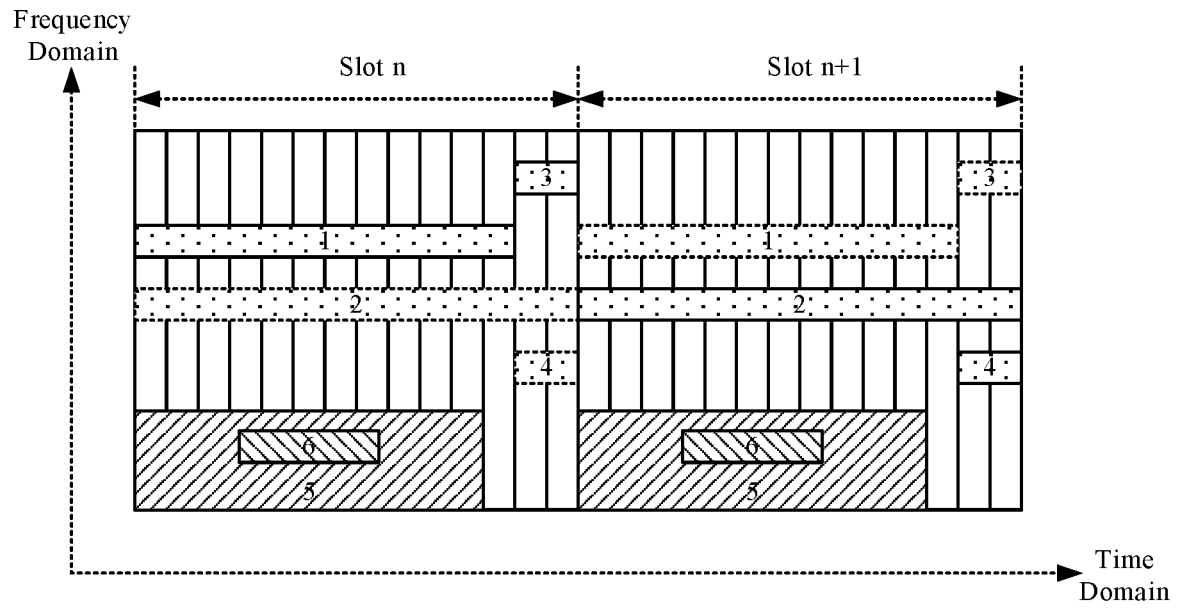
FIG. 22 is still another schematic diagram illustrating transmitting uplink feedback information according to some embodiments of the present disclosure.

FIG. 22 is still another schematic diagram illustrating transmitting uplink feedback information according to some embodiments of the present disclosure.

In some embodiments, as shown in FIG. 22, for example, there are still 7 DCIs from DCI 1 to DCI 7. Pieces of uplink feedback information indicated by DCI 1, DCI 3, and DCI 4 correspond to first time/frequency resource 1 in time slot n, pieces of uplink feedback information indicated by DCI 2 and DCI 6 correspond to second time/frequency resource 2 in time slot n+1, a piece of uplink feedback information indicated by DCI 3 corresponds to third time/frequency resource 3 in time slot n, and a piece of uplink feedback information indicated by DCI 4 corresponds to fourth time/frequency resource 4 in time slot n+1. The division rule with respect to the set is: set 1 includes first time/frequency resource 1, set 2 includes second time/frequency resource 2, and set 3 includes third time/frequency resource 3 and fourth time/frequency resource 4.

In determining the uplink feedback information to be transmitted by multiplexing the time/frequency resources for transmitting the uplink data in each of different time units, it can be obtained that, in time slot n, first time/frequency resource 1 overlaps with time/frequency resources for transmitting the uplink data, so that the pieces of uplink feedback information associated with DCI 1, DCI 3, and DCI 4 corresponding to first time/frequency resource 1 require to be transmitted by multiplexing the time/frequency resources for transmitting the uplink data. And it can be obtained that, in time slot n+1, second time/frequency resource 2 overlaps with time/frequency resources for transmitting the uplink data, so that the pieces of uplink feedback information associated with DCI 2 and DCI 6 corresponding to second time/frequency resource 2 require to be transmitted by multiplexing the time/frequency resources for transmitting the uplink data.

Based on the example shown in FIG. 22, in combination with the example described at steps S37 and S334, in each of different time units, according to the uplink feedback information determined in each time unit, the uplink feedback information is transmitted to the base station in the corresponding time unit by multiplexing the time/frequency resources for transmitting the uplink data. That is, in time slot n, only the uplink feedback information which requires to be multiplexed with time/frequency resources used for transmitting uplink data in time slot n, is transmitted by multiplexing the time/frequency resources used for transmitting the uplink data in time slot n. In time slot n+1, only the uplink feedback information which requires to be multiplexed with time/frequency resources used for transmitting uplink data in time slot n+1, is transmitted by multiplexing the time/frequency resources used for transmitting the uplink data in time slot n+1.

In view of this, it can be obtained that in time slot n, the pieces of the uplink feedback information associated with DCI 1, DCI 3, and DCI 4 corresponding to first time/frequency resource 1 are transmitted by multiplexing the time/frequency resources for transmitting the uplink data; in time slot n+1, the pieces of the uplink feedback information associated with DCI 2 and DCI 6 corresponding to second time/frequency resource 2 are transmitted by multiplexing the time/frequency resources for transmitting the uplink data.

Based on the example shown in FIG. 22 and in combination with the example described at steps S38 and S335, in each of different time units, the uplink feedback information to be multiplexed with time/frequency resources for transmitting the uplink data as determined in each time unit is combined, and the uplink feedback information is transmitted to the base station by multiplexing the time/frequency resources for transmitting uplink data. That is, in time slot n, both of the uplink feedback information to be multiplexed with time/frequency resources for transmitting uplink data in time slot n, and the uplink feedback information to be multiplexed with time/frequency resources for transmitting uplink data in time slot n+1, are transmitted by multiplexing the time/frequency resources for transmitting the uplink data in time slot n.

Correspondingly, in time slot n+1, both of the uplink feedback information to be multiplexed with the time/frequency resources for transmitting the uplink data in time slot n, and the uplink feedback information to be multiplexed with the time/frequency resources for transmitting the uplink data in time slot n+1, are transmitted by multiplexing the time/frequency resources for transmitting the uplink data in time slot n+1.

According to this, it can be obtained that, in time slot n, the pieces of the uplink feedback information associated with DCI 1, DCI 3, DCI 4, DCI 2, and DCI 6 are transmitted by multiplexing the time/frequency resources used for transmitting the uplink data; in time slot n+1, the pieces of the uplink feedback information associated with DCI 1, DCI 3, DCI 4, DCI 2, and DCI 6 are transmitted by multiplexing the time/frequency resources used for transmitting the uplink data.

It should be noted that the time unit referred to in the above examples can be a slot, and the slot can include 14 symbols, or can be other time unit, for example, a time length including a time unit other than 14 symbols.

Corresponding to the above examples of the method of indicating uplink feedback information and the method of transmitting uplink feedback information, the present disclosure also provides examples of an apparatus for indicating uplink feedback information and an apparatus for transmitting uplink feedback information.

Figure 23:
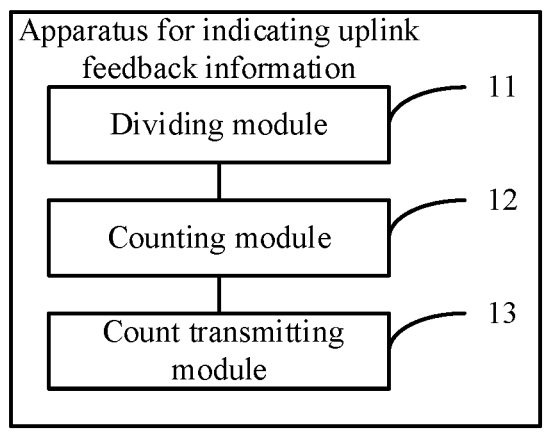
FIG. 23 is a schematic block diagram illustrating an apparatus for indicating uplink feedback information according to some embodiments of the present disclosure.

FIG. 23 is a schematic block diagram illustrating an apparatus for indicating uplink feedback information according to some embodiments of the present disclosure. The apparatus for indicating uplink feedback information shown in this example can be applicable to a base station. As shown in FIG. 23, the apparatus for indicating uplink feedback information can include:

a dividing module 11 configured to divide time/frequency resources, which can be used by user equipment to transmit uplink control information, into at least one time/frequency resource set for the uplink control information;

a counting module 12 configured to count, based on the set to which time/frequency resources for transmitting uplink feedback information corresponding to downlink data for the user equipment belong, pieces of the uplink feedback information in a preset manner; and a count transmitting module 13 configured to transmit one or more current count values to the user equipment in transmitting downlink scheduling information and/or uplink scheduling information.

Figure 24:
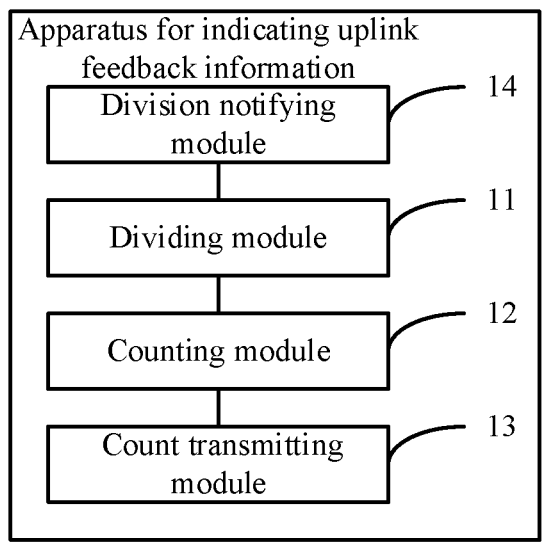
FIG. 24 is a schematic block diagram illustrating another apparatus for indicating uplink feedback information according to some embodiments of the present disclosure.

FIG. 24 is a schematic block diagram illustrating another apparatus for indicating uplink feedback information according to some embodiments of the present disclosure. As shown in FIG. 24, based on the example shown in FIG. 23, the apparatus for indicating uplink feedback information further includes:

a division notifying module 14 configured to notify, to the user equipment, a division rule and/or result with respect to the time/frequency resource set for transmitting the uplink control information.

In some embodiments, the dividing module is configured to perform the dividing according to start and/or end positions of the time/frequency resources for the uplink control information in a time domain; or perform the dividing according to a time unit to which the time/frequency resources for the uplink control information belong in the time domain.

In some embodiments, the counting module is configured to count the pieces of the uplink feedback information in respective ones of the sets in the preset manner.

In some embodiments, the count transmitting module is configured to determine, a first set of the sets to which time/frequency resources for transmitting uplink feedback information corresponding to the downlink scheduling information belong, and select a current count value corresponding to the first set for transmission to the user equipment; and/or according to time/frequency resources for transmitting uplink data corresponding to the uplink scheduling information, and time/frequency resources for transmitting the uplink control information included in respective ones of the sets, select one or more corresponding ones of the current count values for transmission to the user equipment.

Figure 25:
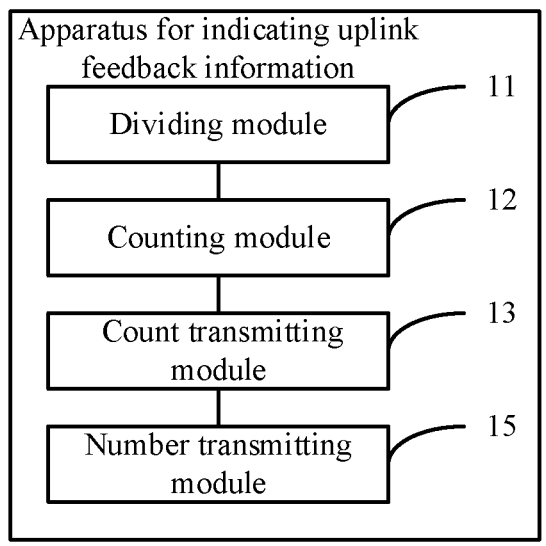
FIG. 25 is a schematic block diagram illustrating still another apparatus for indicating uplink feedback information according to some embodiments of the present disclosure.

FIG. 25 is a schematic block diagram illustrating still another apparatus for indicating uplink feedback information according to some embodiments of the present disclosure. As shown in FIG. 25, based on the example shown in FIG. 23, the apparatus for indicating uplink feedback information further includes:

a number transmitting module 15 configured to transmit a number of the selected current count values to the user equipment when a plurality of ones of the current count values are selected.

In some embodiments, the count transmitting module is configured to, in response to that the time/frequency resources for transmitting the uplink data overlap, in a time domain, with time/frequency resources for transmitting any uplink control information included in a second set of the sets, select a current count value corresponding to the second set for transmission to the user equipment; or transmit the current count values respectively corresponding to the sets to the user equipment.

Figure 26:
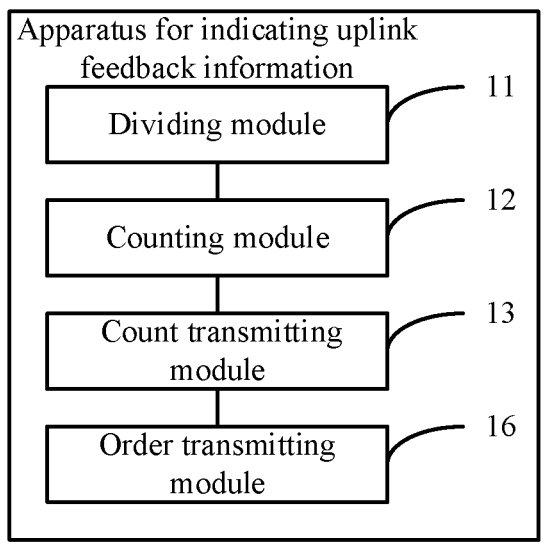
FIG. 26 is a schematic block diagram illustrating still another apparatus for indicating uplink feedback information according to some embodiments of the present disclosure.

FIG. 26 is a schematic block diagram illustrating still another apparatus for indicating uplink feedback information according to some embodiments of the present disclosure. As shown in FIG. 26, based on the example shown in FIG. 23, the apparatus for indicating uplink feedback information further includes:

an order transmitting module 16 configured to determine an order of the count values when a plurality of ones of the current count values are selected.

In some embodiments, the order transmitting module is configured to determine the order of the count values according to a configuration order of the sets corresponding to the current count values in the dividing.

In some embodiments, the order transmitting module is configured to determine the order of the count values according to respective positions in a time domain and/or frequency domain of the time/frequency resources for transmitting the uplink control information in the sets.

In some embodiments, the apparatus for indicating uplink feedback information further includes:

an order notifying module configured to notify the order to the user equipment.

Figure 27:
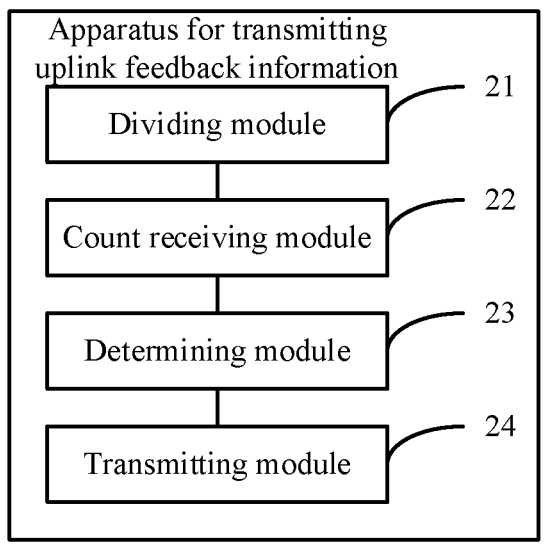
FIG. 27 is a schematic block diagram illustrating an apparatus for transmitting uplink feedback information according to some embodiments of the present disclosure.

FIG. 27 illustrates an apparatus for transmitting uplink feedback information according to some embodiments of the present disclosure. The apparatus for transmitting uplink feedback information of this example can be applicable to user equipment. As shown in FIG. 27, the apparatus includes:

a dividing module 21 configured to divide, according to a same division rule and/or result as that, used by a base station, with respect to a time/frequency resource set for transmitting uplink control information, time/frequency resources, which can be used by the user equipment to transmit the uplink control information, into at least one time/frequency resource set for the uplink control information;

a count receiving module 22 configured to receive one or more current count values from the base station when receiving downlink scheduling information and/or uplink scheduling information;

a determining module 23 configured to determine, according to the current count values, time/frequency resources indicated by the downlink scheduling information for transmitting uplink feedback information, the division rule and/or result with respect to the set, and time/frequency resources indicated by the uplink scheduling information for transmitting uplink data, uplink feedback information to be transmitted by multiplexing the time/frequency resources for transmitting the uplink data; and a transmitting module 24 configured to transmit the uplink feedback information to the base station by multiplexing the time/frequency resources for transmitting the uplink data.

In some embodiments, the division rule and/or result are pre-configured and/or received from the base station in receiving the downlink scheduling information and/or the uplink scheduling information.

Figure 28:
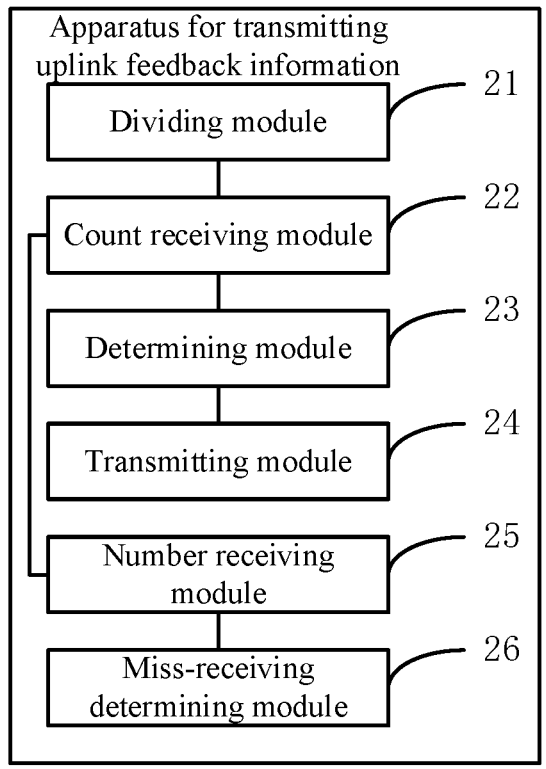
FIG. 28 is a schematic block diagram illustrating another apparatus for transmitting uplink feedback information according to some embodiments of the present disclosure.

FIG. 28 is a schematic block diagram illustrating another apparatus for transmitting uplink feedback information according to some embodiments of the present disclosure. As shown in FIG. 28, based on the example shown in FIG. 27, the apparatus for transmitting uplink feedback information further includes:

a number receiving module 25 configured to receive a number of the count values from the base station when the number of count values is more than one; and a miss-receiving determining module 26 configured to determine whether a count value is missed according to the number and a number of received count values.

In some embodiments, when a number of the count values is more than one, the apparatus further includes:

an order receiving module configured to receive an order of the count values from the base station;

where the determining module is configured to determine, according to the current count values, the time/frequency resources indicated by the downlink scheduling information for transmitting the uplink feedback information, the division rule and/or result with respect to the set, the time/frequency resources indicated by the uplink scheduling information for transmitting the uplink data, and the order, the uplink feedback information to be transmitted by multiplexing the time/frequency resources for transmitting the uplink data.

Figure 29:
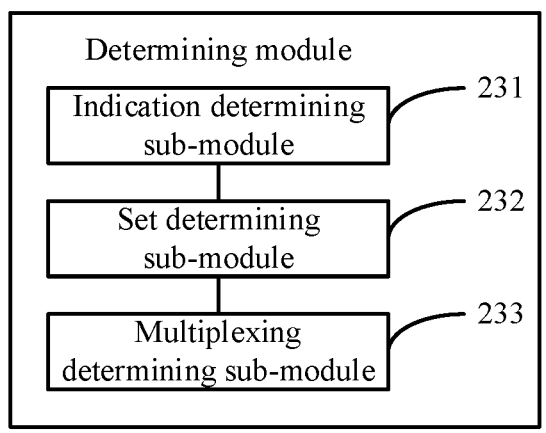
FIG. 29 is a schematic block diagram illustrating a determining module according to some embodiments of the present disclosure.

FIG. 29 is a schematic block diagram illustrating a determining module according to some embodiments of the present disclosure. As shown in FIG. 29, based on the example shown in FIG. 27, the determining module 23 includes:

an indication determining sub-module 231 configured to determine the time/frequency resources indicated by the uplink scheduling information for transmitting the uplink data;

a set determining sub-module 232 configured to determine a time/frequency resource set corresponding to a current count value greater than zero, received in receiving the downlink scheduling information and/or the uplink scheduling information; and a multiplexing determining sub-module 233 configured to determine uplink feedback information, of which time/frequency resources for transmission belonging to a time/ frequency resource set corresponding to the current count value greater than zero are to be used, among the uplink feedback information indicated by the downlink scheduling information, as the uplink feedback information to be transmitted by multiplexing the time/frequency resources for the uplink data.

In some embodiments, in response to that the time/frequency resources for transmitting the uplink control information are in different time units, the determining module is further configured to determine uplink feedback information to be transmitted by multiplexing the time/frequency resources for transmitting the uplink data in each of the different time units;

where the transmitting module is configured to, for each of the different time units, according to the uplink feedback information determined in each time unit, transmit the uplink feedback information to the base station by multiplexing the time/frequency resources for transmitting uplink data in corresponding time unit.

In some embodiments, in response to that the time/frequency resources for transmitting the uplink control information are in different time units, the determining module is further configured to determine uplink feedback information to be transmitted by multiplexing the time/frequency resources for transmitting the uplink data in each of the different time units;

where the transmitting module is configured to, in each of the different time units, combine the determined uplink feedback information to be transmitted by multiplexing the time/frequency resources for transmitting the uplink data in respective ones of the different time units, and transmit the uplink feedback information to the base station by multiplexing the time/frequency resources for transmitting the uplink data.

Regarding the apparatus in the above examples, the specific manners in which each module performs operations has been described in detail in the examples of the method, details of which will not be elaborated herein.

As for the apparatus example, since it basically corresponds to the method example, the relevant part can be referred to the description of the method example. The apparatus example described above are only schematic, where the units described as separate components may or may not be physically separated, and the components shown as units can or cannot be physical units, that is, can be located at one place, or they can be distributed across multiple network elements. Some or all of the modules can be selected according to actual needs to achieve the objective of the solution of this example. Those of ordinary skill in the art can understand and implement without creative efforts.

An example of the present disclosure also provides an electronic device, including:
 a processor; and
 a memory device for storing instructions executed by the processor.

The processor is configured to:
 divide time/frequency resources, which can be used by user equipment to transmit uplink control information, into at least one time/frequency resource set for the uplink control information;
 count, based on the set to which time/frequency resources for transmitting uplink feedback information corresponding to downlink data for the user equipment belong, pieces of the uplink feedback information in a preset manner; and
 transmit one or more current count values to the user equipment in transmitting downlink scheduling information and/or uplink scheduling information.

An example of the present disclosure also provides an electronic device, including:
 a processor; and
 a memory device for storing instructions executed by the processor.

The processor is configured to:
 divide, according to a same division rule and/or result as that, used by a base station, with respect to a time/frequency resource set for transmitting uplink control information, time/frequency resources, which can be used by the user equipment to transmit the uplink control information, into at least one time/frequency resource set for the uplink control information;
 receive one or more current count values from the base station when receiving downlink scheduling information and/or uplink scheduling information;
 determine, according to the current count values, time/frequency resources indicated by the downlink scheduling information for transmitting uplink feedback information, the division rule and/or result with respect to the set, and time/frequency resources indicated by the uplink scheduling information for transmitting uplink data, uplink feedback information to be transmitted by multiplexing the time/frequency resources for transmitting the uplink data; and
 transmit the uplink feedback information to the base station by multiplexing the time/frequency resources for transmitting the uplink data.

An example of the present disclosure also provides a computer-readable storage medium storing a computer program that, when executed by a processor, causes the processor to:
 divide time/frequency resources, which can be used by user equipment to transmit uplink control information, into at least one time/frequency resource set for the uplink control information;
 count, based on the set to which time/frequency resources for transmitting uplink feedback information corresponding to downlink data for the user equipment belong, pieces of the uplink feedback information in a preset manner; and
 transmit one or more current count values to the user equipment in transmitting downlink scheduling information and/or uplink scheduling information.

An example of the present disclosure also provides a computer-readable storage medium storing a computer program that, when executed by a processor, causes the processor to:
 divide, according to a same division rule and/or result as that, used by a base station, with respect to a time/frequency resource set for transmitting uplink control information, time/frequency resources, which can be used by the user equipment to transmit the uplink control information, into at least one time/frequency resource set for the uplink control information;
 receive one or more current count values from the base station when receiving downlink scheduling information and/or uplink scheduling information;
 determine, according to the current count values, time/frequency resources indicated by the downlink scheduling information for transmitting uplink feedback information, the division rule and/or result with respect to the set, and time/frequency resources indicated by the uplink scheduling information for transmitting uplink data, uplink feedback information to be transmitted by multiplexing the time/frequency resources for transmitting the uplink data; and transmit the uplink feedback information to the base station by multiplexing the time/frequency resources for transmitting the uplink data.

Figure 30:
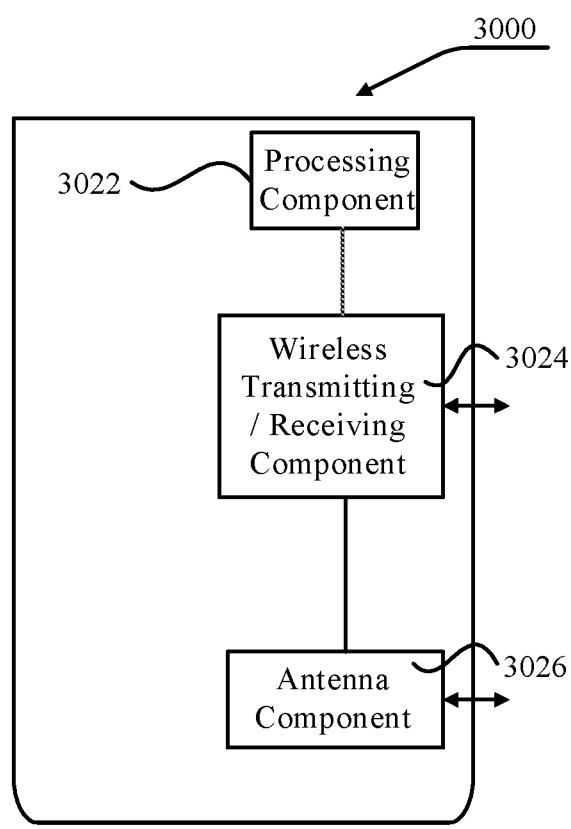
FIG. 30 is a schematic block diagram of an apparatus for indicating uplink feedback information according to some embodiments.

FIG. 30 is a schematic block diagram of an apparatus 3000 for indicating uplink feedback information according to some embodiments. The apparatus 3000 may be provided as a base station. Referring to FIG. 30, the apparatus 3000 includes a processing component 3022, a wireless transmitting/receiving component 3024, an antenna component 3026, and a signal processing portion unique to a wireless interface. The processing component 3022 may further include one or more processors. One of the processors in the processing component 3022 can be configured to perform the method of indicating uplink feedback information according to any of the above examples.

Figure 31:
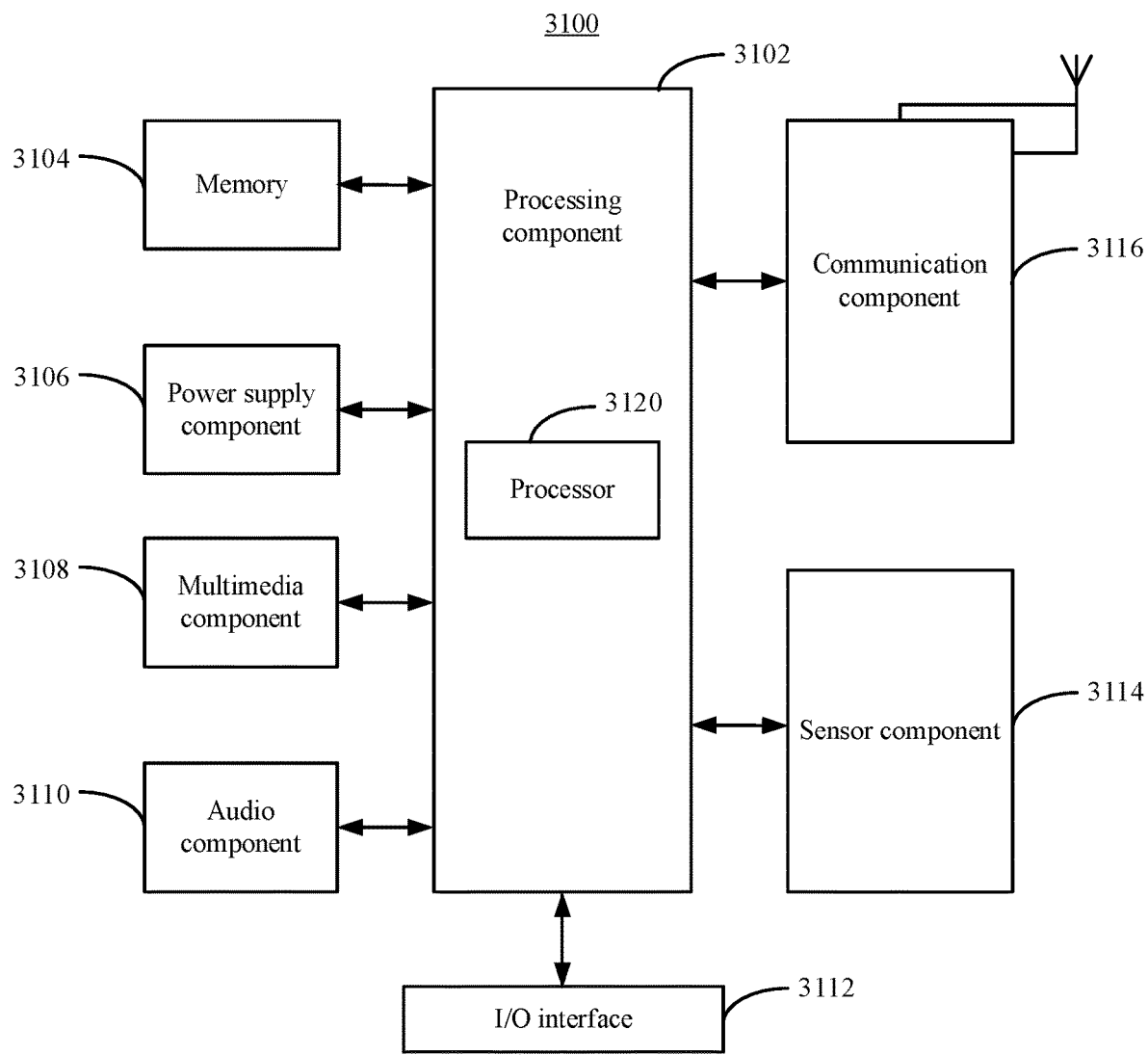
FIG. 31 is a schematic block diagram of an apparatus for transmitting uplink feedback information according to some embodiments.

FIG. 31 is a block diagram of an apparatus 3100 for transmitting uplink feedback information according to some embodiments. For example, the apparatus 3100 may be a mobile phone, a computer, a digital broadcast terminal, a message sending and receiving device, a game console, a tablet device, a medical device, a fitness device, a personal digital assistant, or the like.

As shown in FIG. 31, the apparatus 3100 may include one or more of the following components: a processing component 3102, a memory device 3104, a power supply component 3106, a multimedia component 3108, an audio component 3110, an input/output (I/O) interface 3112, a sensor component 3114, and a communication component 3116.

The processing component 3102 generally controls overall operations of the apparatus 3100, such as operations associated with display, phone calls, data communications, camera operations, and recording operations. The processing component 3102 may include one or more processors 3109 to execute instructions to complete all or part of the steps of the above methods. In addition, the processing component 3102 may include one or more modules which facilitate the interaction between the processing component 3102 and other components. For example, the processing component 3102 may include a multimedia module to facilitate the interaction between the multimedia component 3108 and the processing component 3102.

The memory 3104 is to store various types of data to support the operation of the apparatus 3100. Examples of such data include instructions for any application or method operated on the apparatus 3100, contact data, telephone directory data, messages, pictures, videos and so on. The memory 3104 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 3106 supplies power for different components of the apparatus 3100. The power supply component 3106 may include a power supply management system, one or more power supplies, and other components associated with generating, managing and distributing power for the apparatus 3100.

The multimedia component 3108 includes a screen providing an output interface between the apparatus 3100 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 3108 may include a front camera and/or a rear camera. The front camera and/or rear camera may receive external multimedia data when the apparatus 3100 is in an operating mode, such as a photographing mode or a video mode. Each of the front camera and the rear camera may be a fixed optical lens system or have focal length and optical zooming capability.

The audio component 3110 is to output and/or input an audio signal. For example, the audio component 3110 includes a microphone (MIC). When the apparatus 3100 is in an operating mode, such as a call mode, a record mode and a voice recognition mode, the microphone is to receive an external audio signal. The received audio signal may be further stored in the memory 3104 or sent via the communication component 3116. In some examples, the audio component 3110 further includes a speaker for outputting an audio signal.

The I/O interface 3112 provides an interface between the processing component 3102 and a peripheral interface module. The above peripheral interface module may be a keyboard, a click wheel, buttons, or the like. These buttons may include but not limited to, a home button, a volume button, a start button and a lock button.

The sensor component 3114 includes one or more sensors to provide status assessments of various aspects for the apparatus 3100. For example, the sensor component 3114 may detect the on/off status of the apparatus 3100, and relative positioning of component, for example, the component is a display and a keypad of the apparatus 3100. The sensor component 3114 may also detect a change in position of the apparatus 3100 or a component of the apparatus 3100, a presence or absence of the contact between a user and the apparatus 3100, an orientation or an acceleration/deceleration of the apparatus 3100, and a change in temperature of the apparatus 3100. The sensor component 3114 may include a proximity sensor to detect the presence of a nearby object without any physical contact. The sensor component 3114 may further include an optical sensor, such as a Complementary Metal-Oxide-Semiconductor (CMOS) or Charged Coupled Device (CCD) image sensor which is used in imaging applications. In some examples, the sensor component 3114 may further include an acceleration sensor, a gyroscope sensor, a magnetic sensor, a pressure sensor, or a temperature sensor.

The communication component 3116 is to facilitate wired or wireless communication between the apparatus 3100 and other devices. The apparatus 3100 may access a wireless network based on a communication standard, such as Wi-Fi, 2G or 3G, or a combination thereof. In some embodiments, the communication component 3116 receives a broadcast signal or broadcast related information from an external broadcast management system via a broadcast channel. In some embodiments, the communication component 3116 may further include a Near Field Communication (NFC) module for promoting short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In some embodiments, the apparatus 3100 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the method for transmitting uplink feedback information according to any of the above examples.

In some embodiments, there is further provided a non-transitory computer readable storage medium including instructions, such as the memory 3104 including instructions. The above instructions may be executed by the processor 3120 of the apparatus 3100 to complete the above method. For example, the non-transitory computer readable storage medium may be a Read-Only Memory (ROM), a Random Access Memory (RAM), a CD-ROM, a magnetic tape, a floppy disk, an optical data storage device, and so on.

Other implementations of the present disclosure will be apparent to those skilled in the art from consideration of the specification and practice of the present disclosure herein. The present application is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

It should be noted that, as used herein, relational terms such as first and second are used merely to distinguish one entity or operation from another entity or operation, and do not necessarily require or imply there is any such actual relationship or order between these entities or operations. The terms "including", "comprising" or any other variant thereof are intended to include a non-exclusive inclusion, such that a process, a method, an article, or a device including a plurality of elements includes not only those elements but also other elements not specifically listed, or elements that are inherent to such a process, a method an article, or a device. An element defined by the phrase "comprising a . . . " without further limitation does not exclude the presence of additional identical elements in the process, method, article, or device that includes the element.

The methods and apparatuses provided in the examples of the present disclosure have been described in detail above, and specific examples have been used herein to explain the principles and implementation of the present disclosure. The descriptions of the above examples are only used to help understand the method of the present disclosure and its core ideas. Moreover, for a person of ordinary skill in the art, according to the ideas of the present disclosure, there will be changes in the specific implementation and the scope of application. Accordingly, the contents of this description should not be interpreted as limitations of the present disclosure.

What is claimed is:

1. A method of indicating uplink feedback information, applied to a base station, and comprising:
    dividing time/frequency resources, configured to facilitate user equipment transmitting uplink control information, into at least one time/frequency resource set for the uplink control information;
    counting, based on the set to which time/frequency resources for transmitting uplink feedback information corresponding to downlink data for the user equipment belong, pieces of the uplink feedback information in a preset manner; and
    transmitting one or more current count values to the user equipment in transmitting downlink scheduling information or uplink scheduling information;
    wherein the dividing the time/frequency resources, configured to facilitate the user equipment transmitting the uplink control information, into the at least one time/frequency resource set for the uplink control information comprises:
    performing the dividing according to a time unit to which the time/frequency resources for the uplink control information belong in the time domain, wherein the time unit belongs to a time slot;
    wherein said transmitting one or more current count values to the user equipment in transmitting downlink scheduling information or uplink scheduling information comprises:
    according to time/frequency resources for transmitting uplink data corresponding to the uplink scheduling information, and time/frequency resources for transmitting the uplink control information included in respective ones of the sets, selecting one or more corresponding ones of the current count values for transmission to the user equipment;
    wherein, when a plurality of the corresponding current count values are selected, the method further comprises:
    determining an order of the corresponding current count values.

2. The method according to claim 1, further comprising:
    notifying, to the user equipment, a division rule or result with respect to the time/frequency resource set for transmitting the uplink control information.

3. The method according to claim 1, wherein the dividing the time/frequency resources, configured to facilitate the user equipment transmitting the uplink control information, into the at least one time/frequency resource set for the uplink control information further comprises:
    performing the dividing according to start or end positions of the time/frequency resources for the uplink control information in a time domain.

4. The method according to claim 1, wherein the counting the pieces of the uplink feedback information in the preset manner comprises:
    counting the pieces of the uplink feedback information in respective ones of the sets in the preset manner.

5. The method according to claim 1, wherein said transmitting one or more current count values to the user equipment in transmitting downlink scheduling information or uplink scheduling information further comprises:
    determining a first set of the sets to which time/frequency resources for transmitting uplink feedback information corresponding to the downlink scheduling information belong, and selecting a current count value corresponding to the first set for transmission to the user equipment.

6. The method according to claim 1, wherein, when a plurality of the current count values are selected, the method further comprises:
    transmitting a number of the selected current count values to the user equipment.

7. The method according to claim 1, wherein the selecting the one or more corresponding ones of the current count values for transmission to the user equipment comprises:

in response to that the time/frequency resources for transmitting the uplink data overlap, in a time domain, with time/frequency resources for transmitting any uplink control information included in a second set of the sets, selecting a current count value corresponding to the second set for transmission to the user equipment; or transmitting the current count values respectively corresponding to the sets to the user equipment.

8. The method according to claim 1, wherein the determining the order of the count values comprises:
determining the order of the count values according to a configuration order of the sets corresponding to the current count values in the dividing.

9. The method according to claim 1, wherein the determining the order of the current count values further comprises:
determining the order of the current count values according to respective positions in a time domain or frequency domain of the time/frequency resources for transmitting the uplink control information in the sets.

10. The method according to claim 1, further comprising:
notifying the order to the user equipment.

11. A method of transmitting uplink feedback information, applied to user equipment, and comprising:
dividing, according to a same division rule or result as that used by a base station with respect to a time/frequency resource set for transmitting uplink control information, time/frequency resources, configured to facilitate the user equipment transmitting the uplink control information, into at least one time/frequency resource set for the uplink control information;
receiving one or more current count values from the base station in receiving downlink scheduling information or uplink scheduling information, wherein the one or more current count values are selected by the base station according to time/frequency resources for transmitting uplink data corresponding to the uplink scheduling information, and time/frequency resources for transmitting the uplink control information included in respective ones of sets;
determining, according to the one or more current count values, time/frequency resources indicated by the downlink scheduling information for transmitting uplink feedback information, the division rule or result with respect to the set, and time/frequency resources indicated by the uplink scheduling information for transmitting uplink data, uplink feedback information to be transmitted by multiplexing the time/frequency resources for transmitting the uplink data; and
transmitting the uplink feedback information to the base station by multiplexing the time/frequency resources for transmitting the uplink data;
wherein the dividing the time/frequency resources, configured to facilitate the user equipment transmitting the uplink control information, into the at least one time/frequency resource set for the uplink control information comprises:
performing the dividing according to a time unit to which the time/frequency resources for the uplink control information belong in the time domain, wherein the time unit belongs to a time slot;
wherein an order of the current count values is determined by the base station.

12. The method according to claim 11, wherein the division rule and/or result are pre-configured or received from the base station in receiving the downlink scheduling information and/or the uplink scheduling information.

13. The method according to claim 11, wherein, when a number of the count values is more than one, the method further comprises:
receiving a first number indicating a number of the count values send by the base station; and
determining whether a count value is missed according to the first number and a second number indicating a number of count values received by the user equipment.

14. The method according to claim 11, wherein, when a number of the count values is more than one, the method further comprises:
receiving an order of the count values from the base station;
wherein the determining, according to the current count values, the time/frequency resources indicated by the downlink scheduling information for transmitting the uplink feedback information, the division rule or result with respect to the set, and the time/frequency resources indicated by the uplink scheduling information for transmitting the uplink data, the uplink feedback information to be transmitted by multiplexing the time/frequency resources for transmitting the uplink data comprises:
determining, according to the current count values, the time/frequency resources indicated by the downlink scheduling information for transmitting the uplink determining, according to the current count values, the time/frequency resources indicated by the downlink scheduling information for transmitting the uplink feedback information, the division rule or result with respect to the set, the time/frequency resources indicated by the uplink scheduling information for transmitting the uplink data, and the order, the uplink feedback information to be transmitted by multiplexing the time/frequency resources for transmitting the uplink data.

15. The method according to claim 11, wherein the determining the uplink feedback information to be transmitted by multiplexing the time/frequency resources for transmitting the uplink data comprises:
determining the time/frequency resources indicated by the uplink scheduling information for transmitting the uplink data;
determining a time/frequency resource set corresponding to a current count value greater than zero received in receiving the downlink scheduling information or the uplink scheduling information; and
determining uplink feedback information, of which time/frequency resources for transmission belonging to a time/frequency resource set corresponding to the current count value greater than zero are to be used, among the uplink feedback information indicated by the downlink scheduling information, as the uplink feedback information to be transmitted by multiplexing the time/frequency resources for the uplink data.

16. The method according to claim 11, wherein, when the time/frequency resources for transmitting uplink control information are in different time units, before transmitting the uplink feedback information to the base station by multiplexing the time/frequency resources for transmitting the uplink data, the method further comprises:
determining uplink feedback information to be transmitted by multiplexing the time/frequency resources for transmitting the uplink data in each of the different time units;

wherein transmitting the uplink feedback information to the base station by multiplexing the time/frequency resources for transmitting the uplink data comprises:

for each of the different time units, according to the uplink feedback information determined in each time unit, transmitting the uplink feedback information to the base station by multiplexing the time/frequency resources for transmitting uplink data in corresponding time unit.

17. The method according to claim 11, wherein, when the time/frequency resources for transmitting uplink control information are in different time units, before transmitting the uplink feedback information to the base station by multiplexing the time/frequency resources for transmitting the uplink data, the method further comprises:

determining uplink feedback information to be transmitted by multiplexing the time/frequency resources for transmitting the uplink data in each of the different time units;

wherein transmitting the uplink feedback information to the base station by multiplexing the time/frequency resources for transmitting the uplink data comprises:

in each of the different time units, combining the determined uplink feedback information to be transmitted by multiplexing the time/frequency resources for transmitting the uplink data in respective ones of the different time units, and transmitting the uplink feedback information to the base station by multiplexing the time/frequency resources for transmitting the uplink data.

18. An electronic device implementing the method of claim 1, comprising:

a processor; and a memory device storing instructions for execution by the processor to implement steps of the method.

19. A communication system implementing the method of claim 1, comprising the base station and the user equipment, wherein the user equipment is configured to:

determine a division rule or result with respect to the time/frequency resource set for the uplink control information according to pre-configuration; and receive the division rule or result with respect to the time/frequency resource set for the uplink control information from the base station;

wherein in a case of the user equipment determining division result with respect to the time/frequency resource set for the uplink control information, the current count values are transmitted to the user equipment, such that the user equipment determines the number of pieces of uplink feedback information to be transmitted by multiplexing the time/frequency resources for transmitting uplink data, thereby ensuring that the number of pieces of uplink feedback information to be transmitted from the user equipment by multiplexing the time/frequency resources for transmitting the uplink data is same as the number of pieces of downlink data transmitted from the base station and correspond to the uplink feedback information, and ensuring quality communication between the user equipment and the base station.

* * * * *